US011067158B2

(12) United States Patent
Fujii

(10) Patent No.: US 11,067,158 B2
(45) Date of Patent: Jul. 20, 2021

(54) DRIVING FORCE DISTRIBUTION APPARATUS

(71) Applicant: JTEKT CORPORATION, Osaka (JP)

(72) Inventor: Noriyuki Fujii, Hekinan (JP)

(73) Assignee: JTEKT CORPORATION, Osaka (JP)

( * ) Notice: Subject to any disclaimer, the term of this patent is extended or adjusted under 35 U.S.C. 154(b) by 631 days.

(21) Appl. No.: 15/883,475

(22) Filed: Jan. 30, 2018

(65) Prior Publication Data

US 2018/0223977 A1 Aug. 9, 2018

(30) Foreign Application Priority Data

Feb. 7, 2017 (JP) .............................. JP2017-020249

(51) Int. Cl.
*F16H 48/19* (2012.01)
*F16D 25/10* (2006.01)
*F15B 11/16* (2006.01)
*F16D 25/08* (2006.01)

(52) U.S. Cl.
CPC .............. *F16H 48/19* (2013.01); *F15B 11/16* (2013.01); *F16D 25/083* (2013.01); *F16D 25/10* (2013.01); *F15B 2211/55* (2013.01)

(58) Field of Classification Search
CPC .......... F16H 48/19; F16H 48/32; F16D 25/10; F16D 25/083; F16D 2021/0661; F16D 13/52; F16D 21/02; F15B 11/16; F15B 2211/55; B60K 17/34
See application file for complete search history.

(56) References Cited

U.S. PATENT DOCUMENTS

| 3,138,970 | A | * | 6/1964 | Costa | ...................... F16H 48/22 475/86 |
| 2016/0023550 | A1 | * | 1/2016 | Onitake | ............. B60K 17/3515 180/247 |
| 2016/0208900 | A1 | | 7/2016 | Shoemaker et al. | |
| 2016/0280064 | A1 | * | 9/2016 | Nozu | ...................... F16D 48/06 |
| 2017/0036540 | A1 | | 2/2017 | Yoshimura | |
| 2019/0145470 | A1 | * | 5/2019 | Mohlmann | ............. F16H 48/19 192/85.61 |

FOREIGN PATENT DOCUMENTS

JP 2015-120501 7/2015
WO WO-2015075541 A1 * 5/2015 ........... B60K 17/344

* cited by examiner

*Primary Examiner* — Victor L MacArthur
(74) *Attorney, Agent, or Firm* — Oblon, McClelland, Maier & Neustadt, L.L.P.

(57) ABSTRACT

A driving force distribution apparatus includes a driving force connecting/disconnecting mechanism between a pinion gear shaft and an intermediate rotational member, a first driving force adjustment mechanism between the intermediate rotational member and a second output rotational member, a second driving force adjustment mechanism between the intermediate rotational member and a first output rotational member, and a hydraulic unit configured to generate pressures of hydraulic oil for operating the driving force connecting/disconnecting mechanism and the first and second driving force adjustment mechanisms. The hydraulic unit includes a single hydraulic pump and a hydraulic circuit configured to distribute a pressure of the hydraulic oil, which is discharged from the hydraulic pump, to cylinder chambers of pistons.

3 Claims, 14 Drawing Sheets

DRIVING FORCE DISTRIBUTION APPARATUS

INCORPORATION BY REFERENCE

The disclosure of Japanese Patent Application No. 2017-020249 filed on Feb. 7, 2017 including the specification, drawings and abstract, is incorporated herein by reference in its entirety.

BACKGROUND OF THE INVENTION

1. Field of the Invention

The present invention relates to a vehicle driving force distribution apparatus configured to output an input driving force from first and second output rotational members.

2. Description of the Related Art

Hitherto, a driving force distribution apparatus configured to output an input driving force from first and second output rotational members is mounted on, for example, a four-wheel drive vehicle. This type of driving force distribution apparatus includes a driving force distribution apparatus configured such that the distribution ratio between the driving force to be output from the first output rotational member and the driving force to be output from the second output rotational member can be adjusted depending on traveling conditions of the vehicle (see, for example, Japanese Patent Application Publication No. 2015-120501 (JP 2015-120501 A)).

The driving force distribution apparatus described in JP 2015-120501 A (right and left driving force distribution unit) includes an orthogonal gear pair, a central axle, a clutch, right and left frictional engagement couplings, and a unit case. The orthogonal gear pair is constituted by a drive pinion to which the driving force is input, and a ring gear that meshes with the drive pinion with their gear axes set orthogonal to each other. The central axle extends in a vehicle width direction through the ring gear. The clutch connects or disconnects the ring gear and the central axle in accordance with a movement position of a movable sleeve that is movable in an axial direction relative to the central axle. The right and left frictional engagement couplings respectively control transmission torques between the central axle and right and left rear wheels. The unit case houses the components described above. Each of the right and left couplings includes a multi-disc clutch, and transmits the driving force by a frictional force of a plurality of friction plates that constitute the multi-disc clutch.

In the driving force distribution apparatus described in JP 2015-120501 A, each of the connecting/disconnecting clutch and the right and left couplings is actuated by an electromagnetic component using a magnetic force of an electromagnet. Specifically, an actuator configured to move the movable sleeve includes an electromagnet, a yoke, and a movable piece. The yoke holds the electromagnet. The movable piece is arranged so as to face the yoke. A ratchet mechanism and a piston are arranged between the movable piece and the movable sleeve. A pressing member configured to press the multi-disc clutch of each of the right and left couplings brings the friction plates into frictional contact with each other by a cam thrust of a ball cam mechanism actuated by the magnetic force of the electromagnet. In this structure, the number of components of the apparatus increases, and therefore the size of the apparatus and the assembling man-hours may increase.

SUMMARY OF THE INVENTION

It is one object of the present invention to provide a driving force distribution apparatus in which the number of components can be reduced as compared to a case where an electromagnetic component is used, whereby the size of the apparatus and the assembling man-hours can be reduced.

One aspect of the present invention relates to a driving force distribution apparatus configured to output a driving force, which is input from an input rotational member, from a first output rotational member and a second output rotational member via an intermediate rotational member.

The driving force distribution apparatus includes:

a driving force connecting/disconnecting mechanism configured to connect or disconnect the driving force between the input rotational member and the intermediate rotational member;

a first driving force adjustment mechanism configured to adjust the driving force to be transmitted between the intermediate rotational member and the first output rotational member;

a second driving force adjustment mechanism configured to adjust the driving force to be transmitted between the intermediate rotational member and the second output rotational member;

a hydraulic unit configured to generate pressures of hydraulic oil for operating the driving force connecting/disconnecting mechanism, the first driving force adjustment mechanism, and the second driving force adjustment mechanism; and a casing that houses the driving force connecting/disconnecting mechanism, the first driving force adjustment mechanism, and the second driving force adjustment mechanism.

The casing has a plurality of cylinder chambers in which hydraulic pressures of the hydraulic oil supplied from the hydraulic unit are applied to a piston of the driving force connecting/disconnecting mechanism, a piston of the first driving force adjustment mechanism, and a piston of the second driving force adjustment mechanism. The hydraulic unit includes a single hydraulic pump and a hydraulic circuit. The hydraulic circuit is configured to distribute a pressure of the hydraulic oil, which is discharged from the hydraulic pump, to the plurality of cylinder chambers.

According to the driving force distribution apparatus of the aspect described above, the number of components can be reduced as compared to the case where the electromagnetic component is used, whereby the size of the apparatus and the assembling man-hours can be reduced.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A first embodiment of the present invention is described with reference to FIG. 1 to FIG. 6.

Figure 1:
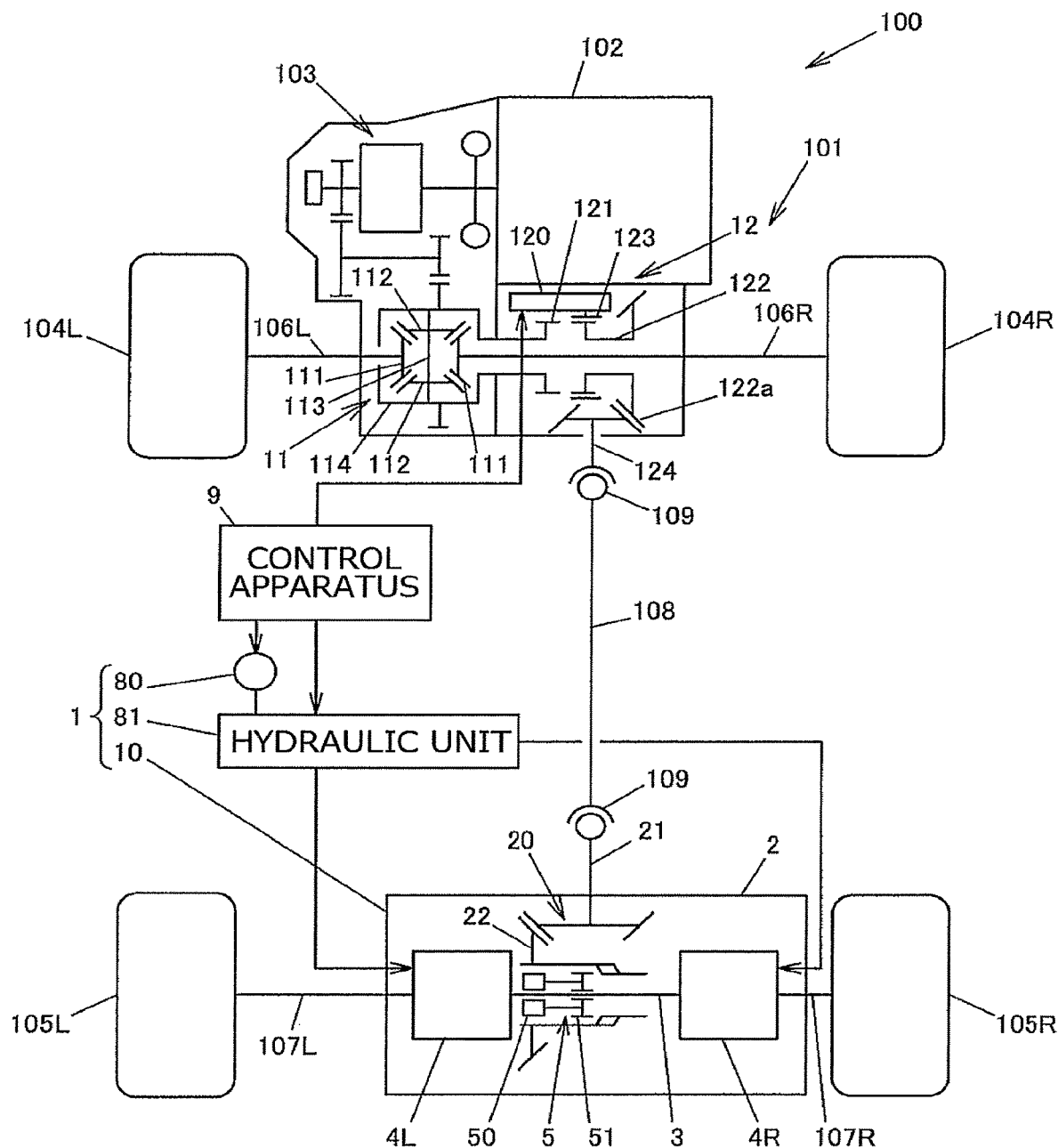
FIG. 1 is a structural diagram schematically illustrating an example of the structure of a four-wheel drive vehicle on which a driving force distribution apparatus according to a first embodiment of the present invention is mounted.

FIG. 1 is a structural diagram schematically illustrating an example of the structure of a four-wheel drive vehicle on which a driving force distribution apparatus according to the first embodiment of the present invention is mounted.

A four-wheel drive vehicle 100 includes an engine 102, a transmission 103, front wheels 104R and 104L, rear wheels 105R and 105L, a driving force transmission system 101, and a control apparatus 9. The engine 102 serves as a drive source configured to generate a driving force for traveling. The front wheels 104R and 104L serve as a pair of right and left main driving wheels. The rear wheels 105R and 105L serve as a pair of right and left auxiliary driving wheels. The driving force transmission system 101 is configured to transmit the driving force of the engine 102 to the front wheels 104R and 104L and the rear wheels 105R and 105L.

The four-wheel drive vehicle 100 is switchable between a four-wheel drive mode in which the driving force of the engine 102 is transmitted to the front wheels 104R and 104L and the rear wheels 105R and 105L and a two-wheel drive mode in which the driving force of the engine 102 is transmitted only to the front wheels 104R and 104L. In this embodiment, the suffixes "R" and "L" of the reference symbols are used to represent "right" and "left" with respect to a forward traveling direction of the vehicle.

The driving force transmission system 101 includes a front differential 11, a dog clutch 12, a propeller shaft 108, a driving force distribution apparatus 1, drive shafts 106R and 106L on the front wheel side, and drive shafts 107R and 107L on the rear wheel side. The dog clutch 12 is configured to interrupt the transmission of the driving force. The propeller shaft 108 extends in a fore-and-aft direction of the vehicle. The driving force of the engine 102 is constantly transmitted to the front wheels 104R and 104L. The driving force of the engine 102 is transmitted to the rear wheels 105R and 105L via the dog clutch 12, the propeller shaft 108, and the driving force distribution apparatus 1. The driving force distribution apparatus 1 is configured to distribute the driving force of the engine 102 to the right and left rear wheels 105R and 105L in a disconnectable manner while allowing differential motion.

The front differential 11 includes a pair of side gears 111, a pair of pinion gears 112, a pinion gear support member 113, and a front differential case 114. The side gears 111 are respectively coupled to the drive shafts 106R and 106L on the front wheel side. The pinion gears 112 mesh with the side gears 111 with their gear axes set orthogonal to each other. The pinion gear support member 113 supports the pinion gears 112. The front differential case 114 houses the side gears 111, the pinion gears 112, and the pinion gear support member 113. The driving force of the engine 102 that is obtained through speed variation performed by the transmission 103 is transmitted to the front differential case 114.

The dog clutch 12 includes a first rotational member 121, a second rotational member 122, a sleeve 123, and an actuator 120. The first rotational member 121 rotates together with the front differential case 114. The second rotational member 122 is arranged side by side with the first rotational member 121 in an axial direction. The sleeve 123 is configured to couple the first rotational member 121 and the second rotational member 122 so as not to be rotatable relative to each other. The actuator 120 is controlled by the control apparatus 9. The actuator 120 causes the sleeve 123 to move in the axial direction between a coupled position where the sleeve 123 meshes with the first rotational member 121 and the second rotational member 122 and a decoupled position where the sleeve 123 meshes with the second rotational member 122 alone. When the sleeve 123 is located at the coupled position, the first rotational member 121 and the second rotational member 122 are coupled so as not to be rotatable relative to each other. When the sleeve 123 is located at the decoupled position, the first rotational member 121 and the second rotational member 122 are freely rotatable relative to each other.

The propeller shaft 108 receives the driving force of the engine 102 from the front differential case 114 via the dog clutch 12, and transmits the driving force toward the driving force distribution apparatus 1. A pair of universal joints 109 are attached to both ends of the propeller shaft 108. The universal joint 109 on the front side of the vehicle couples a pinion gear shaft 124 and the propeller shaft 108 to each other. The pinion gear shaft 124 meshes with a ring gear portion 122a provided on the second rotational member 122 of the dog clutch 12. The universal joint 109 on the rear side of the vehicle couples the propeller shaft 108 and a pinion gear shaft 21 of the driving force distribution apparatus 1 described later.

The engine 102 outputs the driving force to the drive shafts 106R and 106L on the front wheel side via the transmission 103 and the front differential 11, thereby driving the front wheels 104R and 104L. The engine 102 also outputs the driving force to the drive shafts 107R and 107L on the rear wheel side via the transmission 103, the dog clutch 12, the propeller shaft 108, and the driving force distribution apparatus 1, thereby driving the rear wheels 105R and 105L.

The driving force distribution apparatus 1 includes a main body 10, an electric motor 80, and a hydraulic unit 81. The electric motor 80 is controlled by the control apparatus 9. The hydraulic unit 81 supplies hydraulic oil to the main body 10 by a rotational force of the electric motor 80. The hydraulic unit 81 includes a hydraulic pump and a plurality of solenoid valves. The electric motor 80 is a power source of the hydraulic pump. The solenoid valves are controlled by the control apparatus 9. Details of the structure of the hydraulic unit 81 are described later.

The driving force distribution apparatus 1 distributes and outputs the driving force, which is input to the pinion gear shaft 21, to the drive shafts 107R and 107L on the rear wheel side. The drive shaft 107R is coupled to the right rear wheel 105R, and the drive shaft 107L is coupled to the left rear wheel 105L. For example, the control apparatus 9 controls the driving force distribution apparatus 1 so that a greater driving force is transmitted to the rear wheels 105R and 105L as a differential rotation speed is higher or as the amount of a driver's depressing operation for an accelerator pedal is larger. The differential rotation speed is a difference between an average rotation speed of the front wheels 104R and 104L and an average rotation speed of the rear wheels 105R and 105L.

Figure 2:
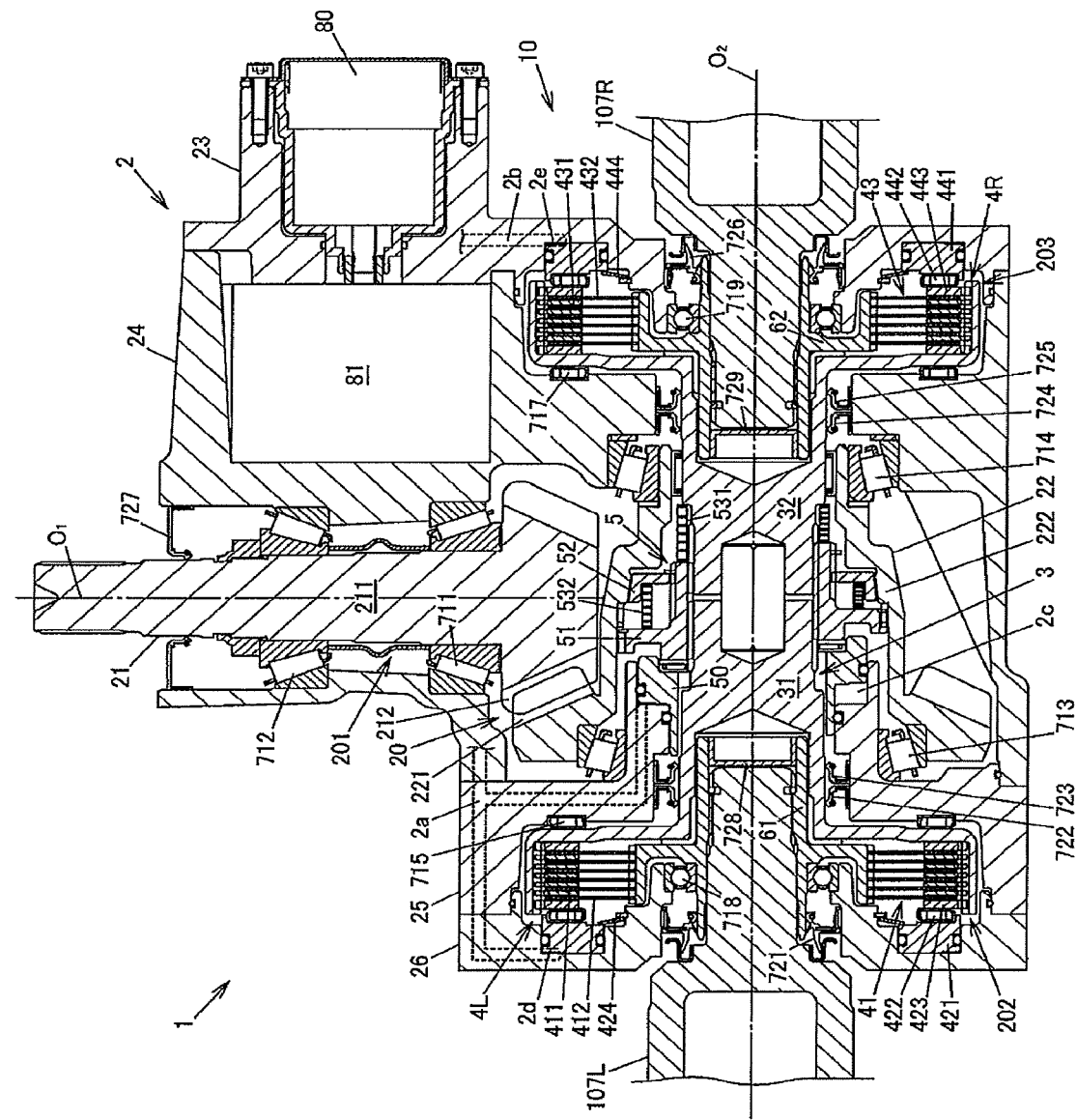
FIG. 2 is an overall sectional view illustrating an example of the structure of the driving force distribution apparatus according to the first embodiment.
Figure 3:
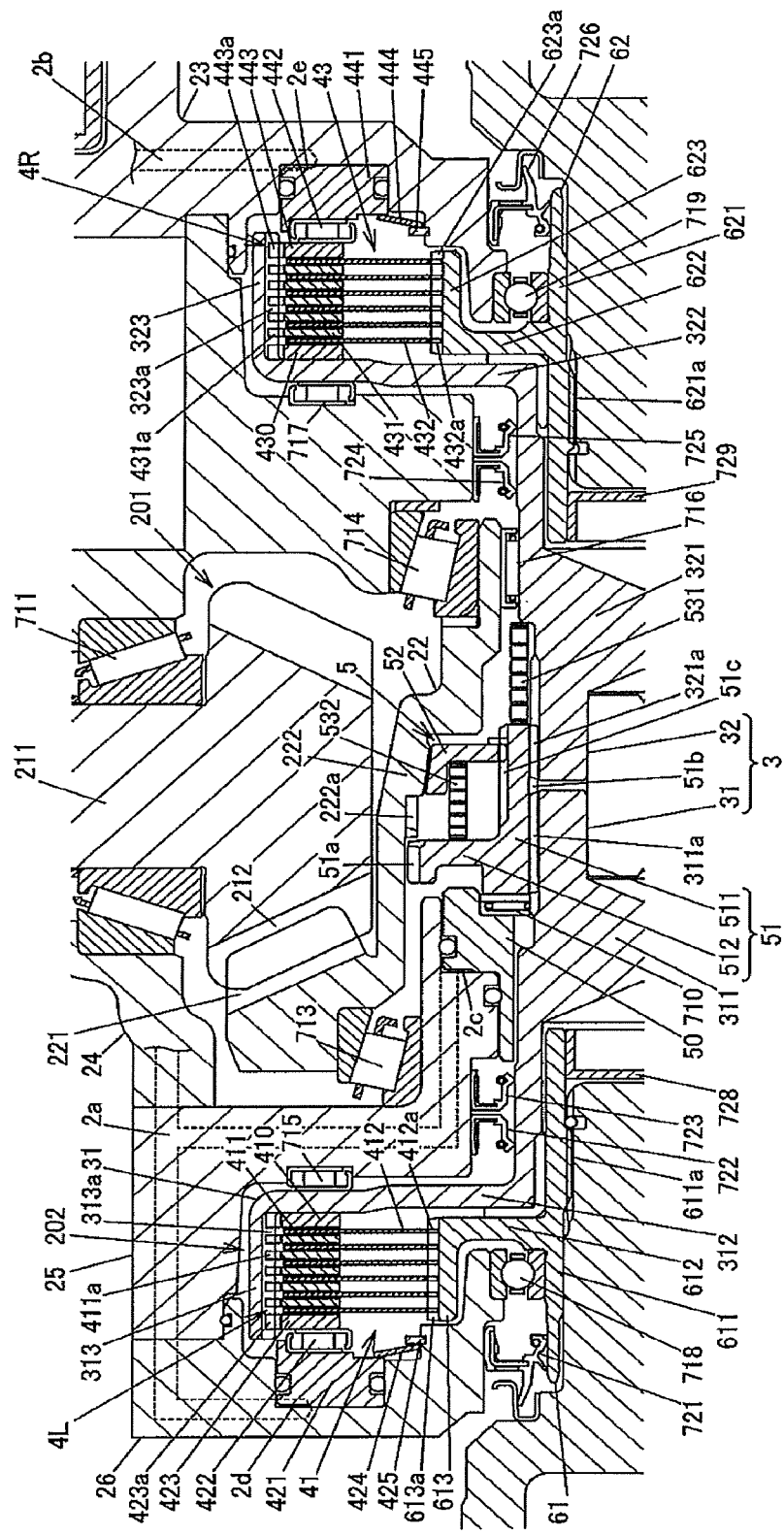
FIG. 3 is an enlarged view illustrating a part of FIG. 2 in an enlarged manner.
Figure 4:
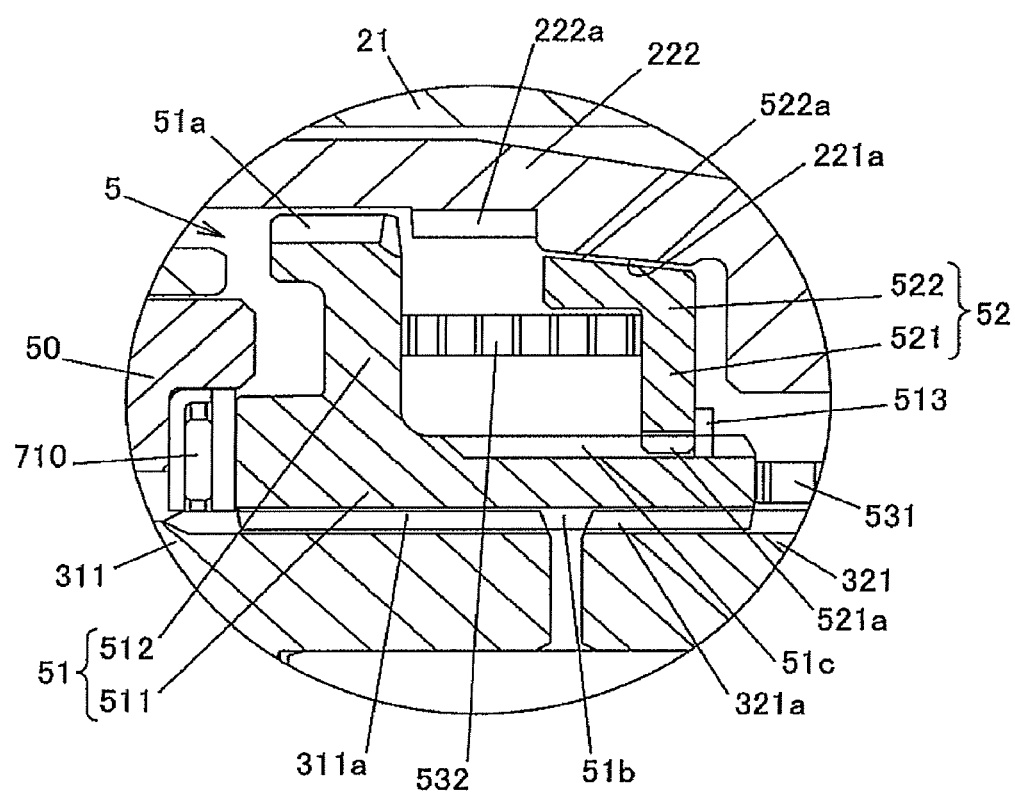
FIG. 4 is an enlarged view illustrating a part of FIG. 2 in an enlarged manner.

FIG. 2 is an overall sectional view illustrating an example of the structure of the driving force distribution apparatus 1. FIG. 3 and FIG. 4 are enlarged views each illustrating a part of FIG. 2 in an enlarged manner.

The main body 10 of the driving force distribution apparatus 1 includes an orthogonal gear pair 20, a casing 2, an intermediate rotational member 3, first and second driving force adjustment mechanisms 4R and 4L, a driving force connecting/disconnecting mechanism 5, and first and second output rotational members 61 and 62. The orthogonal gear pair 20 is constituted by the pinion gear shaft 21 serving as an input rotational member, and a ring gear member 22 serving as an orthogonal gear member that meshes with the pinion gear shaft 21 with their gear axes set orthogonal to each other. The casing 2 is constituted by first to fourth case members 23 to 26. The intermediate rotational member 3 is arranged so as to be coaxially rotatable relative to the ring gear member 22. The driving force connecting/disconnecting mechanism 5 connects or disconnects the driving force between the pinion gear shaft 21 and the intermediate rotational member 3.

The driving force distribution apparatus 1 outputs the driving force, which is input from the pinion gear shaft 21, from the first and second output rotational members 61 and 62 via the intermediate rotational member 3. In the orthogonal gear pair 20, a rotation axis $O_1$ of the pinion gear shaft 21 extends in the fore-and-aft direction of the vehicle, and a rotation axis $O_2$ of the ring gear member 22 extends in a lateral direction of the vehicle. The driving force connecting/disconnecting mechanism 5 includes a piston 50, a clutch member 51, and a friction member 52. The piston 50 generates a pressing force by the hydraulic oil supplied from the hydraulic unit 81. The clutch member 51 and the friction member 52 are moved by the pressing force of the piston 50. FIG. 1 schematically illustrates the casing 2, the orthogonal gear pair 20, the intermediate rotational member 3, the piston 50, the first and second driving force adjustment mechanisms 4R and 4L, and the clutch member 51.

The casing 2 is constructed by fastening the first to fourth case members 23 to 26 with bolts (not illustrated). The first case member 23 houses the electric motor 80. The second case member 24 houses the hydraulic unit 81, the orthogonal gear pair 20, the first driving force adjustment mechanism 4R, and the driving force connecting/disconnecting mechanism 5. The third case member 25 houses the second driving force adjustment mechanism 4L. The fourth case member 26 closes an opening of the third case member 25.

The driving force of the engine 102 is input to the pinion gear shaft 21 via the propeller shaft 108. The pinion gear shaft 21 integrally has a columnar shaft portion 211 and a pinion gear portion 212. The shaft portion 211 is connected to the universal joint 109 on the rear side of the vehicle (see FIG. 1). The pinion gear portion 212 is provided at one end of the shaft portion 211. The shaft portion 211 of the pinion gear shaft 21 is supported on the second case member 24 by a pair of tapered roller bearings 711 and 712.

The ring gear member 22 has a ring gear portion 221 and a tubular portion 222. The ring gear portion 221 meshes with the pinion gear portion 212 of the pinion gear shaft 21 with their gear axes set orthogonal to each other. The tubular portion 222 has a central axis parallel to the rotation axis $O_2$ of the ring gear portion 221. The ring gear portion 221 has a plurality of gear teeth formed as a hypoid gear. Each of the pinion gear portion 212 and the ring gear portion 221 is not limited to the hypoid gear, and an orthogonal gear such as a bevel gear may be used as appropriate. The inner peripheral surface of the tubular portion 222 is provided with a meshing portion 222a formed of a plurality of spline projections (see FIG. 3). The ring gear portion 221 and the tubular portion 222 rotate together by receiving the driving force from the pinion gear shaft 21.

In this embodiment, the ring gear member 22 is integrally formed as a whole. The ring gear member 22 may be divided into a plurality of segments, and the segments may be integrated by welding or the like.

At two positions between which the portion of the ring gear portion 221 that meshes with the pinion gear portion 212 is interposed in the direction of the rotation axis $O_2$, the tubular portion 222 of the ring gear member 22 is rotatably supported by a pair of bearings 713 and 714 arranged between the tubular portion 222 and the casing 2. In this embodiment, the bearings 713 and 714 are tapered roller bearings. One bearing 713 supports the end of the tubular portion 222 on the gear back face side, and the other bearing 714 supports the end of the tubular portion 222 on the gear tooth flank side.

The intermediate rotational member 3 is arranged so as to be coaxially rotatable relative to the ring gear member 22. In this embodiment, the intermediate rotational member 3 is constituted by a first intermediate shaft member 31 and a second intermediate shaft member 32. The first intermediate shaft member 31 transmits the driving force, which is transmitted to the ring gear member 22, to the second driving force adjustment mechanism 4L. The second intermediate shaft member 32 transmits the driving force, which is transmitted to the ring gear member 22, to the first driving force adjustment mechanism 4R.

As illustrated in FIG. 3, the first intermediate shaft member 31 integrally has a shaft portion 311, an annular plate portion 312, and a cylindrical portion 313. One end of the shaft portion 311 is housed inside the tubular portion 222 of the ring gear member 22. The annular plate portion 312 projects radially outward from the outer peripheral surface of the shaft portion 311 that protrudes from the tubular portion 222. The cylindrical portion 313 extends from the radially outer edge of the annular plate portion 312 in an axial direction parallel to the rotation axis $O_2$. The outer peripheral surface of the shaft portion 311 is provided with a meshing portion 311a formed of a plurality of spline projections. The inner peripheral surface of the cylindrical portion 313 is provided with a meshing portion 313a formed of a plurality of spline projections.

Similarly, the second intermediate shaft member 32 integrally has a shaft portion 321, an annular plate portion 322, and a cylindrical portion 323. One end of the shaft portion 321 is housed inside the tubular portion 222 of the ring gear member 22. The annular plate portion 322 projects radially outward from the outer peripheral surface of the shaft portion 321 that protrudes from the tubular portion 222. The cylindrical portion 323 extends from the radially outer edge of the annular plate portion 322 in the axial direction parallel to the rotation axis $O_2$. The outer peripheral surface of the shaft portion 321 is provided with a meshing portion 321a formed of a plurality of spline projections. The inner peripheral surface of the cylindrical portion 323 is provided with a meshing portion 323a formed of a plurality of spline projections. The shaft portion 311 of the first intermediate shaft member 31 and the shaft portion 321 of the second intermediate shaft member 32 are coaxially arranged along the rotation axis $O_2$, and face each other in the axial direction inside the tubular portion 222 of the ring gear member 22.

A thrust roller bearing 715 is arranged between the annular plate portion 312 of the first intermediate shaft member 31 and the third case member 25. A cylindrical roller bearing 716 is arranged between the shaft portion 321 of the second intermediate shaft member 32 and the tubular portion 222 of the ring gear member 22. A thrust roller bearing 717 is arranged between the annular plate portion 322 of the second intermediate shaft member 32 and the second case member 24.

The piston 50 is arranged inside the tubular portion 222 of the ring gear member 22, and is movable in the direction of the rotation axis $O_2$ relative to the ring gear member 22 and the intermediate rotational member 3. The piston 50 has an annular shape in which the shaft portion 311 of the first intermediate shaft member 31 is inserted through a central portion of the piston 50. The casing 2 has first and second oil paths 2a and 2b and first to third cylinder chambers 2c to 2e that communicate with the hydraulic unit 81. The piston 50 is moved in the axial direction by a hydraulic pressure of the hydraulic oil supplied from the hydraulic unit 81 to the first cylinder chamber 2c via the first oil path 2a.

The first and second cylinder chambers 2c and 2d communicate with the first oil path 2a, and the third cylinder chamber 2e communicates with the second oil path 2b. The hydraulic unit 81 generates pressures of the hydraulic oil for operating the driving force connecting/disconnecting mechanism 5 and the first and second driving force adjustment mechanisms 4R and 4L, and supplies the pressure to the first to third cylinder chambers 2c to 2e via the first and second oil paths 2a and 2b. For example, the first and second oil paths 2a and 2b are holes formed in the first to fourth case members 23 to 26 with a drill. The first cylinder chamber 2c is formed in the second case member 24. The second cylinder chamber 2d is formed in the fourth case member 26. The third cylinder chamber 2e is formed in the first case member 23.

The clutch member 51 integrally has a cylindrical portion 511 and a flange portion 512. The cylindrical portion 511 is externally fitted to one end of each of the shaft portion 311 of the first intermediate shaft member 31 and the shaft portion 321 of the second intermediate shaft member 32. The flange portion 512 projects radially outward from the cylindrical portion 511. The outer peripheral surface of the flange portion 512 of the clutch member 51 is provided with an outer meshing portion 51a that meshes with the meshing portion 222a formed on the inner peripheral surface of the tubular portion 222 of the ring gear member 22. The inner peripheral surface of the cylindrical portion 511 of the clutch member 51 is provided with an inner meshing portion 51b that meshes with the meshing portions 311a and 321a respectively formed on the outer peripheral surfaces of the shaft portions 311 and 321 of the first and second intermediate shaft members 31 and 32. The outer peripheral surface of the cylindrical portion 511 of the clutch member 51 is provided with a friction member meshing portion 51c that meshes with the friction member 52 described later. Each of the outer meshing portion 51a, the inner meshing portion 51b, and the friction member meshing portion 51c is formed of a plurality of spline projections extending in the axial direction.

The clutch member 51 is arranged inside a part of the tubular portion 222 of the ring gear member 22 on the gear tooth flank side out of the gear back face side and the gear tooth flank side. A first spring member 531 is arranged between the axial end face of the cylindrical portion 511 of the clutch member 51 and a stepped surface provided on the outer peripheral surface of the shaft portion 321 of the second intermediate shaft member 32. The first spring member 531 is compressed in the axial direction. For example, the first spring member 531 is a coiled wave spring that is formed into a coil shape by helically winding a flat wire while providing waveforms.

In this embodiment, the inner meshing portion 51b of the clutch member 51 constantly meshes with the meshing portions 311a and 321a of the first and second intermediate shaft members 31 and 32, and the clutch member 51 rotates together with the intermediate rotational member 3. The piston 50 causes the clutch member 51 to move in the direction of the rotation axis $O_2$ relative to the ring gear member 22 and the intermediate rotational member 3. Thus, the clutch member 51 reciprocally moves between a coupled position where the outer meshing portion 51a meshes with the meshing portion 222a of the ring gear member 22 and a decoupled position where the outer meshing portion 51a does not mesh with the meshing portion 222a of the ring gear member 22. A thrust roller bearing 710 is arranged between the piston 50 and the clutch member 51.

In this embodiment, when the hydraulic oil is supplied to the first cylinder chamber 2c, the clutch member 51 is pressed by the piston 50 to move to the coupled position. When the pressure in the first cylinder chamber 2c is reduced and therefore the pressing force of the piston 50 is reduced, the clutch member 51 is moved to the decoupled position by an urging force of the first spring member 531. In this manner, the piston 50 switches between a coupled state in which the intermediate rotational member 3 rotates together with the ring gear member 22 and a decoupled state in which the intermediate rotational member 3 is rotatable relative to the ring gear member 22.

When the clutch member 51 is located at the coupled position, the ring gear member 22 and each of the first and second intermediate shaft members 31 and 32 are coupled by the clutch member 51 so as not to be rotatable relative to each other, and the first and second intermediate shaft members 31 and 32 rotate together with the ring gear member 22. When the clutch member 51 is located at the decoupled position, the ring gear member 22 and each of the first and second intermediate shaft members 31 and 32 are rotatable relative to each other, and the torque is not transmitted between the ring gear member 22 and each of the first and second intermediate shaft members 31 and 32.

When the ring gear member 22 and each of the first and second intermediate shaft members 31 and 32 are coupled by the clutch member 51, the friction member 52 reduces the relative rotation speed between the ring gear member 22 and each of the first and second intermediate shaft members 31 and 32 by a frictional force generated by moving in the direction of the rotation axis $O_2$ relative to the ring gear member 22. Thus, the rotational synchronization is achieved. This facilitates the mesh between the outer meshing portion 51a of the clutch member 51 and the meshing portion 222a of the ring gear member 22.

The friction member 52 has an annular shape in which the friction member 52 is externally fitted to the cylindrical portion 511 of the clutch member 51. As illustrated in FIG. 4, the friction member 52 integrally has an annular plate portion 521 and an outer peripheral cylindrical portion 522. The outer peripheral cylindrical portion 522 extends from the radially outer edge of the annular plate portion 521 in the axial direction. The inner peripheral surface of the annular plate portion 521 is provided with a meshing portion 521a that is formed of a plurality of spline projections and meshes with the friction member meshing portion 51c of the clutch member 51. This structure restricts rotation of the friction member 52 relative to the clutch member 51, and allows axial movement of the friction member 52 relative to the clutch member 51.

Movement of the friction member 52 away from the flange portion 512 of the clutch member 51 is restricted by a snap ring 513 fitted to the outer peripheral surface of the cylindrical portion 511 of the clutch member 51. The first spring member 531 urges the clutch member 51 and the friction member 52 in a direction opposite to the pressing direction of the piston 50.

A second spring member 532 is arranged between the annular plate portion 521 of the friction member 52 and the flange portion 512 of the clutch member 51 while being compressed. For example, the second spring member 532 is a coiled wave spring. The second spring member 532 elastically transmits the pressing force of the piston 50 to the friction member 52 via the clutch member 51.

The outer peripheral surface of the outer peripheral cylindrical portion 522 of the friction member 52 is formed as a tapered friction surface 522a to be brought into frictional contact with a target frictional slide surface 221a formed on the inner peripheral surface of the tubular portion 222 of the ring gear member 22. The friction surface 522a and the target frictional slide surface 221a are brought into surface contact with each other in parallel by the pressing force of the piston 50, thereby generating the frictional force for reducing the relative rotation speed between the ring gear member 22 and each of the first and second intermediate shaft members 31 and 32. The second spring member 532 brings the friction surface 522a of the friction member 52 into elastic contact with the target frictional slide surface 221a of the ring gear member 22 by the pressing force of the piston 50. The elastic contact herein means that an object is brought into contact with another object by being elastically pressed against this object. The friction member 52 is pressed by the piston 50 together with the clutch member 51, thereby generating the frictional force between the friction surface 522a and the target frictional slide surface $221a_1$.

The first output rotational member 61 integrally has an inner cylindrical portion 611, an annular plate portion 612, and an outer cylindrical portion 613. A spline fitting portion 611a is formed on the inner peripheral surface of the inner cylindrical portion 611. The drive shaft 107L is coupled to the spline fitting portion 611a so as not to be rotatable relative to the spline fitting portion 611a. The annular plate portion 612 projects radially outward from the outer peripheral surface of the inner cylindrical portion 611 at a substantially central portion in the axial direction. The outer cylindrical portion 613 extends from the radially outer edge of the annular plate portion 612 in the axial direction. The outer peripheral surface of the outer cylindrical portion 613 is provided with a meshing portion 613a formed of a plurality of spline projections extending in the axial direction. The first output rotational member 61 is rotatably supported on the casing 2 by a ball bearing 718 arranged between the outer peripheral surface of the inner cylindrical portion 611 and the inner surface of the fourth case member 26.

Similarly, the second output rotational member 62 integrally has an inner cylindrical portion 621, an annular plate portion 622, and an outer cylindrical portion 623. A spline fitting portion 621a is formed on the inner peripheral surface of the inner cylindrical portion 621. The drive shaft 107R is coupled to the spline fitting portion 621a so as not to be rotatable relative to the spline fitting portion 621a. The annular plate portion 622 projects radially outward from the outer peripheral surface of the inner cylindrical portion 621 at a substantially central portion in the axial direction. The outer cylindrical portion 623 extends from the radially outer edge of the annular plate portion 622 in the axial direction. The outer peripheral surface of the outer cylindrical portion 623 is provided with a meshing portion 623a formed of a plurality of spline projections extending in the axial direction. The second output rotational member 62 is rotatably supported on the casing 2 by a ball bearing 719 arranged between the outer peripheral surface of the inner cylindrical portion 621 and the inner surface of the first case member 23.

In the coupled state in which the intermediate rotational member 3 rotates together with the ring gear member 22, the first driving force adjustment mechanism 4R is configured to adjust the driving force to be transmitted between the second intermediate shaft member 32 and the second output rotational member 62. Similarly, in the coupled state in which the intermediate rotational member 3 rotates together with the ring gear member 22, the second driving force adjustment mechanism 4L is configured to adjust the driving force to be transmitted between the first intermediate shaft member 31 and the first output rotational member 61. The first driving force adjustment mechanism 4R and the second driving force adjustment mechanism 4L are arranged at positions between which the bearings 713 and 714 that support the ring gear member 22 are interposed in the direction of the rotation axis $O_2$. More specifically, the first driving force adjustment mechanism 4R is arranged on the right rear wheel 105R side with respect to the bearing 714 on the gear tooth flank side out of the pair of bearings 713 and 714, and the second driving force adjustment mechanism 4L is arranged on the left rear wheel 105L side with respect to the bearing 713 on the gear back face side out of the pair of bearings 713 and 714.

The first driving force adjustment mechanism 4R includes a multi-disc clutch 43, a piston 441, a thrust roller bearing 442, a pressing plate 443, and a spring member 444. The multi-disc clutch 43 is constituted by a plurality of outer clutch plates 431 configured to rotate together with the second intermediate shaft member 32, and a plurality of inner clutch plates 432 configured to rotate together with the second output rotational member 62. The thrust roller bearing 442 and the pressing plate 443 are arranged between the piston 441 and the multi-disc clutch 43. The spring member 444 urges the piston 441 away from the multi-disc clutch 43. A plurality of protrusions 443a are formed on the outer peripheral edge of the pressing plate 443. The protrusions 443a engage with the meshing portion 323a of the second intermediate shaft member 32. In this embodiment, the spring member 444 is a coned disc spring. The end of the spring member 444 that is opposite to the piston 441 is locked by a snap ring 445 fitted to the first case member 23.

A plurality of protrusions 431a are formed on the outer peripheral edge of each of the outer clutch plates 431. The protrusions 431a engage with the meshing portion 323a of the second intermediate shaft member 32. A plurality of protrusions 432a are formed on the inner peripheral edge of each of the inner clutch plates 432. The protrusions 432a engage with the meshing portion 623a of the second output rotational member 62. The outer clutch plates 431 are movable in the axial direction relative to the second intermediate shaft member 32. The inner clutch plates 432 are movable in the axial direction relative to the second output rotational member 62. A receiving plate 430 is arranged between the annular plate portion 322 of the second intermediate shaft member 32 and the inner clutch plate 432 located at a farthest position from the pressing plate 443 out of the plurality of inner clutch plates 432.

The multi-disc clutch 43 transmits the driving force from the second intermediate shaft member 32 to the second output rotational member 62 by a frictional force generated between the outer clutch plates 431 and the inner clutch plates 432 in accordance with a pressing force applied by the piston 441. The piston 441 receives the hydraulic pressure of the hydraulic oil supplied from the hydraulic unit 81 to the third cylinder chamber 2e via the second oil path 2b. When the axial movement force generated by the hydraulic pressure is greater than an urging force of the spring member 444, the piston 441 moves toward the multi-disc clutch 43. The third cylinder chamber 2e is formed by an annular groove that is formed in the end face of the first case member 23 on the second case member 24 side. In the third cylinder chamber 2e, the hydraulic pressure of the hydraulic oil supplied from the hydraulic unit 81 is applied to the piston 441.

Similarly, the second driving force adjustment mechanism 4L includes a multi-disc clutch 41, a piston 421, a thrust roller bearing 422, a pressing plate 423, and a spring member 424. The multi-disc clutch 41 is constituted by a plurality of outer clutch plates 411 configured to rotate together with the first intermediate shaft member 31, and a plurality of inner clutch plates 412 configured to rotate together with the first output rotational member 61. The thrust roller bearing 422 and the pressing plate 423 are arranged between the piston 421 and the multi-disc clutch 41. The spring member 424 urges the piston 421 away from the multi-disc clutch 41. A plurality of protrusions 423a are formed on the outer peripheral edge of the pressing plate 423. The protrusions 423a engage with the meshing portion 313a of the first intermediate shaft member 31. The spring member 424 is a coned disc spring. The end of the spring member 424 that is opposite to the piston 421 is locked by a snap ring 425 fitted to the fourth case member 26.

A plurality of protrusions 411a are formed on the outer peripheral edge of each of the outer clutch plates 411. The protrusions 411a engage with the meshing portion 313a of the first intermediate shaft member 31. A plurality of protrusions 412a are formed on the inner peripheral edge of each of the inner clutch plates 412. The protrusions 412a engage with the meshing portion 613a of the first output rotational member 61. A receiving plate 410 is arranged between the annular plate portion 312 of the first intermediate shaft member 31 and the inner clutch plate 412 located at a farthest position from the pressing plate 423 out of the plurality of inner clutch plates 412.

The multi-disc clutch 41 transmits the driving force from the first intermediate shaft member 31 to the first output rotational member 61 by a frictional force generated between the outer clutch plates 411 and the inner clutch plates 412 in accordance with a pressing force applied by the piston 421. The piston 421 receives the hydraulic pressure of the hydraulic oil supplied from the hydraulic unit 81 to the second cylinder chamber 2d via the first oil path 2a. When the axial movement force generated by the hydraulic pressure is greater than an urging force of the spring member 424, the piston 421 moves toward the multi-disc clutch 41. The second cylinder chamber 2d is formed by an annular groove that is formed in the end face of the fourth case member 26 on the third case member 25 side. In the second cylinder chamber 2d, the hydraulic pressure of the hydraulic oil supplied from the hydraulic unit 81 is applied to the piston 421.

The internal space of the casing 2 is partitioned into a first housing portion 201, a second housing portion 202, and a third housing portion 203 by seal members 721 to 729. The first housing portion 201 houses the orthogonal gear pair 20. The second housing portion 202 houses the second driving force adjustment mechanism 4L. The third housing portion 203 houses the first driving force adjustment mechanism 4R. The second housing portion 202 and the third housing portion 203 are filled with lubricating oil for lubricating the frictional slide between the outer clutch plates 411 and the inner clutch plates 412 and between the outer clutch plates 431 and the inner clutch plates 432, thereby suppressing wear. The first housing portion 201 is filled with lubricating oil having a relatively high viscosity for lubricating the mesh between the ring gear portion 221 and the pinion gear portion 212. The multi-disc clutches 41 and 43 are wet type friction clutches in which the frictional slide between the outer clutch plates 411 and the inner clutch plates 412 and between the outer clutch plates 431 and the inner clutch plates 432 is lubricated by the lubricating oil.

In the two-wheel drive mode of the four-wheel drive vehicle 100 in which the driving force of the engine 102 is transmitted only to the front wheels 104R and 104L, the control apparatus 9 decouples the first rotational member 121 and the second rotational member 122 of the dog clutch 12, and also decouples the ring gear member 22 and the intermediate rotational member 3 via the clutch member 51. Therefore, even when the four-wheel drive vehicle 100 is traveling, the propeller shaft 108, the second rotational member 122 and the pinion gear shaft 124 of the dog clutch 12, and the orthogonal gear pair 20 stop their rotation. Thus, power loss caused by rotational resistance of those components is suppressed, whereby the fuel efficiency is improved.

When the four-wheel drive vehicle 100 travels in the two-wheel drive mode, the first and second intermediate shaft members 31 and 32 are rotated by drag torques of the multi-disc clutches 41 and 43 that are generated by the viscosity of the lubricating oil. When the four-wheel drive vehicle 100 travels in the two-wheel drive mode, the control apparatus 9 prevents the rotation of the electric motor 80. Therefore, the hydraulic pressure is not supplied to the first to third cylinder chambers 2c to 2e.

When the two-wheel drive mode is switched to the four-wheel drive mode, the control apparatus 9 first controls the electric motor 80 and the hydraulic unit 81 to supply the hydraulic oil to the first oil path 2a, thereby moving the clutch member 51 and the friction member 52 in the axial direction. When the rotation of the clutch member 51 and the rotation of the ring gear member 22 are synchronized by the frictional force between the friction surface 522a of the friction member 52 and the target frictional slide surface 221a of the ring gear member 22, the outer meshing portion 51a of the clutch member 51 meshes with the meshing portion 222a of the ring gear member 22. Therefore, the ring gear member 22 and each of the first and second intermediate shaft members 31 and 32 are coupled by the clutch member 51 so as not to be rotatable relative to each other. In FIG. 2, a part above the rotation axis $O_2$ indicates a state before the ring gear member 22 and the intermediate rotational member 3 are coupled by the clutch member 51, and a part below the rotation axis $O_2$ indicates a state after the ring gear member 22 and the intermediate rotational member 3 are coupled by the clutch member 51.

Then, the control apparatus 9 controls the electric motor 80 and the hydraulic unit 81 to increase the hydraulic pressure of the hydraulic oil supplied to the second and third cylinder chambers 2d and 2e, thereby transmitting the rotational forces of the drive shafts 107R and 107L to the propeller shaft 108 via the first and second driving force adjustment mechanisms 4R and 4L, the first and second intermediate shaft members 31 and 32, the clutch member 51, and the orthogonal gear pair 20. Thus, the propeller shaft 108 is rotated. When the rotation of the first rotational member 121 and the rotation of the second rotational member 122 are synchronized in the dog clutch 12, the control apparatus 9 controls the actuator 120. The actuator 120 causes the sleeve 123 to couple the first rotational member 121 and the second rotational member 122 so that the first rotational member 121 and the second rotational member 122 are not rotatable relative to each other. Thus, the driving force of the engine 102 is transmissible to the rear wheels 105R and 105L.

Figure 5:
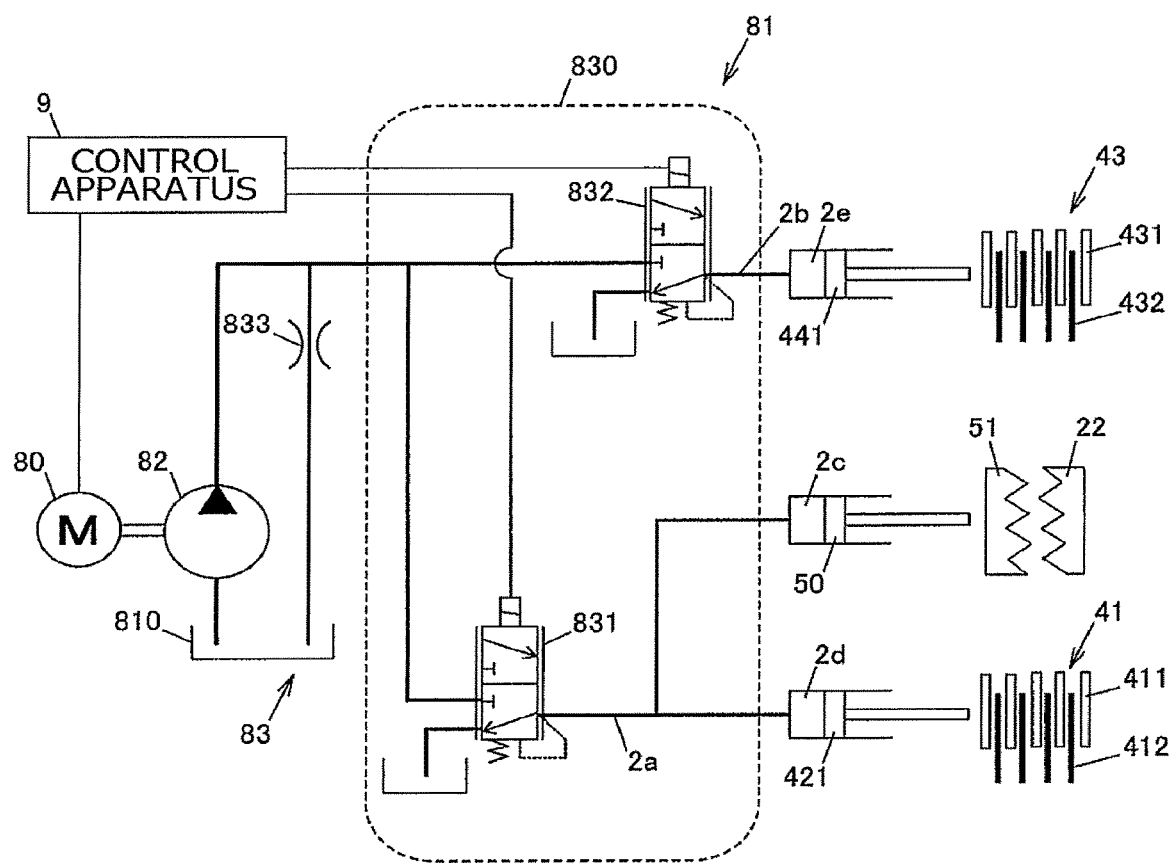
FIG. 5 is a hydraulic circuit diagram illustrating an example of the structure of a hydraulic unit.

FIG. 5 is a hydraulic circuit diagram illustrating an example of the structure of the hydraulic unit 81. The hydraulic unit 81 includes a single hydraulic pump 82 and a hydraulic circuit 83. The hydraulic circuit 83 distributes the pressure of the hydraulic oil, which is discharged from the hydraulic pump 82, to the first to third cylinder chambers 2c to 2e. For example, a vane pump or a gear pump may be used as the hydraulic pump 82. The hydraulic circuit 83 includes a pressure regulating unit 830 configured to regulate the pressure of the hydraulic oil, which is discharged from the hydraulic pump 82, by reducing the pressure. In this embodiment, the pressure regulating unit 830 includes a first solenoid valve 831 and a second solenoid valve 832. Further, the hydraulic circuit 83 includes an orifice 833 arranged between a discharge side of the hydraulic pump 82 and a reservoir 810.

Each of the first solenoid valve 831 and the second solenoid valve 832 is a pressure control valve configured to regulate the pressure of the hydraulic oil discharged from the hydraulic pump 82 in accordance with a control current supplied from the control apparatus 9. More specifically, each of the first solenoid valve 831 and the second solenoid valve 832 is an electromagnetic proportional pressure control valve. The first solenoid valve 831 drains a part of the hydraulic oil discharged from the hydraulic pump 82 to reduce the pressure of the hydraulic oil, and outputs the hydraulic oil to the first oil path 2a. Similarly, the second solenoid valve 832 drains a part of the hydraulic oil discharged from the hydraulic pump 82 to reduce the pressure of the hydraulic oil, and outputs the hydraulic oil to the second oil path 2b. The control apparatus 9 controls the electric motor 80 so that the discharge pressure of the hydraulic pump 82 is higher than the pressure of the hydraulic oil to be supplied to the first to third cylinder chambers 2c to 2e.

The first solenoid valve 831 is configured to regulate the pressure of the hydraulic oil for operating the second driving force adjustment mechanism 4L by increasing or decreasing the pressure of the hydraulic oil to be supplied to the second cylinder chamber 2d via the first oil path 2a. The second solenoid valve 832 is configured to regulate the pressure of the hydraulic oil for operating the first driving force adjustment mechanism 4R by increasing or decreasing the pressure of the hydraulic oil to be supplied to the third cylinder chamber 2e via the second oil path 2b.

In this embodiment, the first oil path 2a communicates with the first cylinder chamber 2c and the second cylinder chamber 2d, and therefore the driving force connecting/disconnecting mechanism 5 is operated by the hydraulic oil whose pressure is regulated by the first solenoid valve 831. The piston 50 receives the pressure of the hydraulic oil supplied from the first solenoid valve 831 to the first cylinder chamber 2c via the first oil path 2a, thereby pressing the clutch member 51 and the friction member 52 in the axial direction against the urging force of the first spring member 531. The hydraulic circuit 83 may be configured such that the driving force connecting/disconnecting mechanism 5 is operated by the hydraulic oil whose pressure is regulated by the second solenoid valve 832. In this case, the first cylinder chamber 2c communicates with the second oil path 2b instead of the first oil path $2a_1$.

In this embodiment, the pressure receiving areas of the pistons 50, 421, and 441 and the spring constants of the first spring member 531 and the spring members 424 and 444 are set such that the pressure in the first cylinder chamber 2c when the piston 50 of the driving force connecting/disconnecting mechanism 5 starts to operate is lower than the pressures when the pistons 441 and 421 of the first and second driving force adjustment mechanisms 4R and 4L start to operate. In other words, the piston 50 of the driving force connecting/disconnecting mechanism 5 starts to move by the pressure of the hydraulic oil in the first cylinder chamber 2c in a state in which the pistons 441 and 421 of the first and second driving force adjustment mechanisms 4R and 4L do not start to move while being pressed toward the deep sides of the third and second cylinder chambers 2e and 2d by the spring members 444 and 424.

Figure 6A:
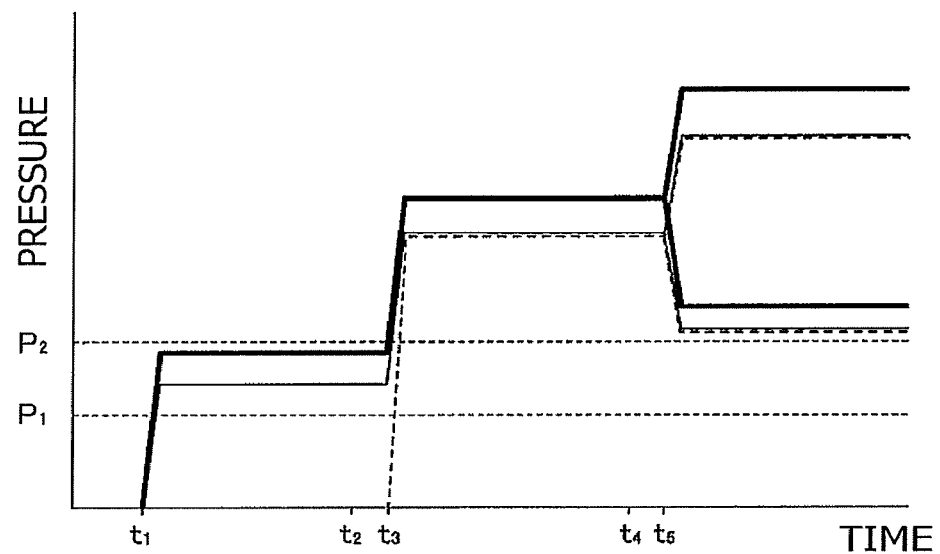
FIG. 6A is a graph illustrating an example of changes in a discharge pressure of a hydraulic pump and output hydraulic pressures of first and second solenoid valves when a two-wheel drive mode is switched to a four-wheel drive mode.

FIG. 6A is a graph illustrating an example of changes in the discharge pressure of the hydraulic pump 82 and the output hydraulic pressures of the first and second solenoid valves 831 and 832 (hydraulic pressures of the hydraulic oil in the first and second oil paths 2a and 2b) when the two-wheel drive mode is switched to the four-wheel drive mode. In this graph, the vertical axis represents a hydraulic pressure while the horizontal axis is a temporal axis. The discharge pressure of the hydraulic pump 82 is indicated by a wide line. The output hydraulic pressure of the first solenoid valve 831 is indicated by a narrow line. The output hydraulic pressure of the second solenoid valve 832 is indicated by a dashed line. A pressure $P_1$ on the vertical axis is a pressure of the hydraulic oil at which the piston 50 of the driving force connecting/disconnecting mechanism 5 starts to operate but the pistons 441 and 421 of the first and second driving force adjustment mechanisms 4R and 4L do not operate. A pressure $P_2$ on the vertical axis is a pressure of the hydraulic oil at which the pistons 441 and 421 of the first and second driving force adjustment mechanisms 4R and 4L start to operate.

Figure 6B:
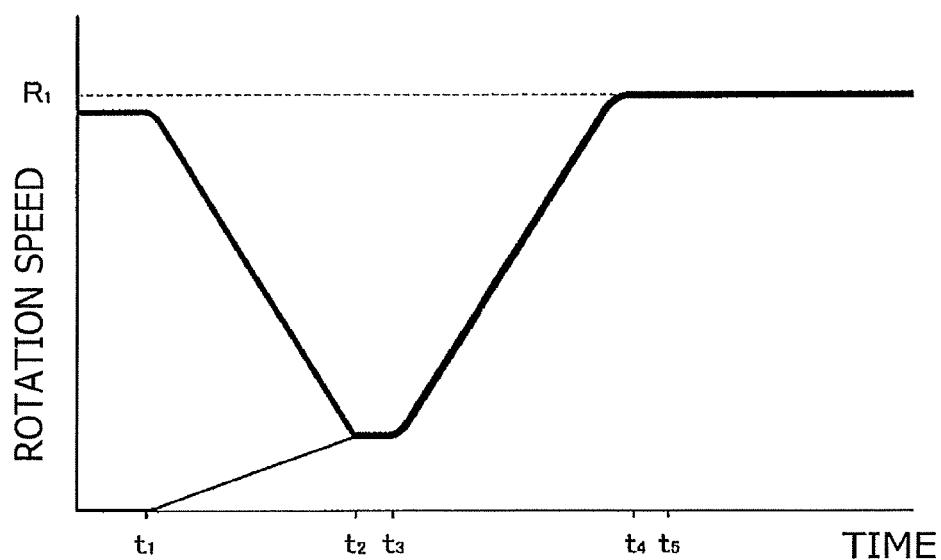
FIG. 6B is a graph illustrating an example of changes in rotation speeds of an intermediate rotational member and a ring gear member.

In FIG. 6B, the horizontal axis (temporal axis) is set in common with that of the graph of FIG. 6A, and the vertical axis represents a rotation speed. The rotation speed of the intermediate rotational member 3 (first and second intermediate shaft members 31 and 32) is indicated by a wide line. The rotation speed of the ring gear member 22 is indicated by a narrow line. A rotation speed $R_1$ on the vertical axis is a rotation speed of each of the intermediate rotational member 3 and the ring gear member 22 corresponding to a vehicle speed when the four-wheel drive vehicle 100 travels in the four-wheel drive mode.

For example, when the four-wheel drive vehicle 100 is switched from the two-wheel drive mode to the four-wheel drive mode through a switching operation performed by the driver of the four-wheel drive vehicle 100, the control apparatus 9 controls the electric motor 80 and the first solenoid valve 831 to regulate the output hydraulic pressure of the first solenoid valve 831 to be equal to or higher than the pressure $P_1$ and lower than the pressure $P_2$. Thus, the rotation of the ring gear member 22 and the rotation of each of the intermediate rotational member 3 and the clutch member 51 are synchronized. The clutch member 51 moves to the coupled position, and its outer meshing portion 51a meshes with the meshing portion 222a of the ring gear member 22. In the graphs of FIG. 6A and FIG. 6B, the time when the control of the electric motor 80 and the first solenoid valve 831 is started is represented by $t_1$, and the time when the clutch member 51 and the ring gear member 22 mesh with each other is represented by $t_2$.

During a period before the time $t_1$, the intermediate rotational member 3 is rotated by the drag torques of the multi-disc clutches 43 and 41 at a speed slightly lower than those of the drive shafts 107R and 107L, and the rotation of the ring gear member 22 is stopped. During a period between the times $t_1$ and $t_2$, the rotation speed of the intermediate rotational member 3 decreases and the rotation speed of the ring gear member 22 increases by the frictional force generated by the friction member 52. Therefore, the difference in the rotation speeds of the intermediate rotational member 3 and the ring gear member 22 decreases. When the clutch member 51 and the ring gear member 22 mesh with each other at the time $t_2$, the rotation speeds of the clutch member 51 and the ring gear member 22 are equal to each other.

At a subsequent time $t_3$, the control apparatus 9 controls the electric motor 80 and the first and second solenoid valves 831 and 832 to regulate the output hydraulic pressures of the first and second solenoid valves 831 and 832 to be equal to or higher than the pressure $P_2$. That is, torque transmission from the first and second output rotational members 61 and 62 to the intermediate rotational member 3 by the multi-disc clutches 41 and 43 is started after the clutch member 51 is moved to the coupled position. Therefore, the rotational forces of the drive shafts 107R and 107L are transmitted to the propeller shaft 108 via the first and second driving force adjustment mechanisms 4R and 4L, the intermediate rotational member 3, the clutch member 51, and the orthogonal gear pair 20. Thus, the propeller shaft 108 is rotated.

When the rotation of the first rotational member 121 and the rotation of the second rotational member 122 are synchronized in the dog clutch 12, the control apparatus 9 controls the actuator 120 at a time $t_4$. The actuator 120 causes the sleeve 123 to couple the first rotational member 121 and the second rotational member 122 so that the first rotational member 121 and the second rotational member 122 are not rotatable relative to each other. During a period between the times $t_3$ and $t_4$, the rotation speed of each of the intermediate rotational member 3 and the ring gear member 22 gradually increases toward the rotation speed corresponding to the vehicle speed.

After a time $t_5$, the control apparatus 9 controls the electric motor 80 and the hydraulic unit 81 to regulate the pressure of the hydraulic oil supplied to the third and second cylinder chambers 2e and 2d, thereby adjusting the driving force to be transmitted to the rear wheels 105R and 105L via the first and second driving force adjustment mechanisms 4R and 4L.

Figure 7A:
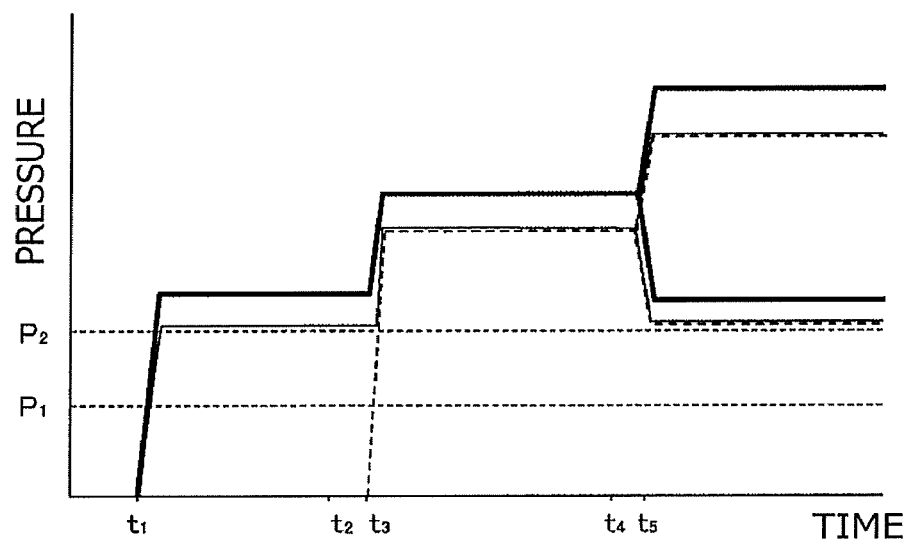
FIG. 7A is a graph illustrating another example 1 of the changes in the discharge pressure of the hydraulic pump and the output hydraulic pressures of the first and second solenoid valves when the two-wheel drive mode is switched to the four-wheel drive mode.
Figure 7B:
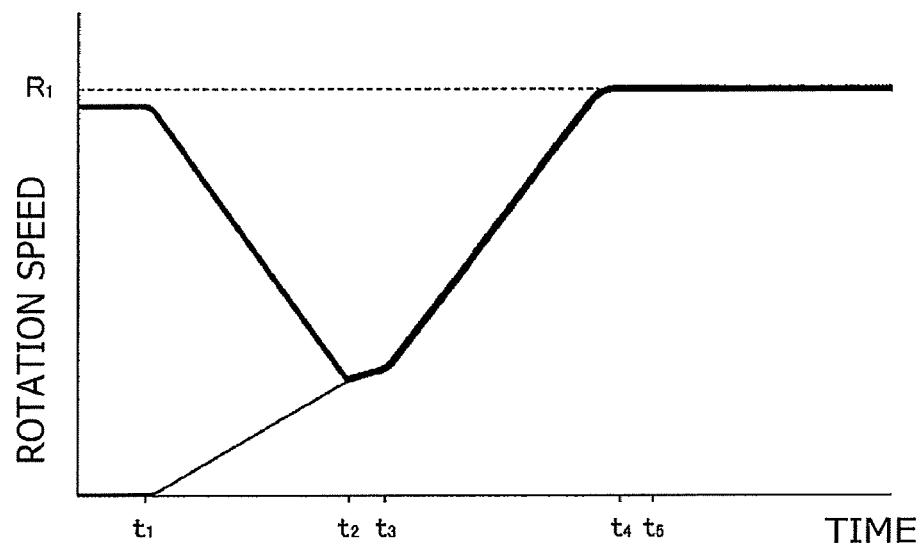
FIG. 7B is a graph illustrating the other example 1 of the changes in the rotation speeds of the intermediate rotational member and the ring gear member.

FIG. 7A is a graph illustrating changes in the discharge pressure of the hydraulic pump 82 and the output hydraulic pressures of the first and second solenoid valves 831 and 832 when the two-wheel drive mode is switched to the four-wheel drive mode according to another example of the control method of the control apparatus 9. In FIG. 7B, the rotation speeds of the intermediate rotational member 3 and the ring gear member 22 when the hydraulic pressures change as illustrated in FIG. 7A are respectively indicated by a wide line and a narrow line.

In the other example, when the friction member 52 generates the frictional force between the friction member 52 and the ring gear member 22, the rotational force is transmitted to the intermediate rotational member 3 via at least one of the first and second driving force adjustment mechanisms 4R and 4L. The control to be performed by the control apparatus 9 in this case is intended for the main body 10 and the hydraulic unit 81 of the driving force distribution apparatus 1 having the structure illustrated in FIG. 1 to FIG. 5.

In the example illustrated in FIG. 6A, description is given of the case where the output hydraulic pressures of the first and second solenoid valves 831 and 832 are lower than the pressure $P_2$ during the period between the times $t_1$ and $t_2$ in which the friction member 52 generates the frictional force between the friction member 52 and the ring gear member 22. In the example illustrated in FIG. 7A, the output hydraulic pressure of the first solenoid valve 831 is equal to or higher than the pressure $P_2$ during the period between the times $t_1$ and $t_2$ in which the friction member 52 generates the frictional force between the friction member 52 and the ring gear member 22. In the example illustrated in the graph of FIG. 7A, the output hydraulic pressure of the second solenoid valve 832 is lower than the pressure $P_2$ during the period between the times $t_1$ and $t_2$, but may be set equal to or higher than the pressure $P_2$.

According to this control method, when the friction member 52 generates the frictional force between the friction member 52 and the ring gear member 22, the rotational force is transmitted from the second driving force adjustment mechanism 4L to the intermediate rotational member 3. That is, the torque transmission from the first output rotational member 61 to the intermediate rotational member 3 by the multi-disc clutch 41 of the second driving force adjustment mechanism 4L is started before the clutch member 51 is moved to the coupled position. Therefore, the rotational force of the first output rotational member 61 is transmitted to the ring gear member 22 via the intermediate rotational member 3 and the friction member 52, and is further transmitted from the ring gear member 22 to the propeller shaft 108 via the pinion gear shaft 21. Thus, the speed of the propeller shaft 108 is increased more quickly.

When the friction member 52 generates the frictional force between the friction member 52 and the ring gear member 22, the torque transmission from the second and first output rotational members 62 and 61 to the intermediate rotational member 3 by the multi-disc clutches 43 and 41 of the first and second driving force adjustment mechanisms 4R and 4L may be started.

Figure 8:
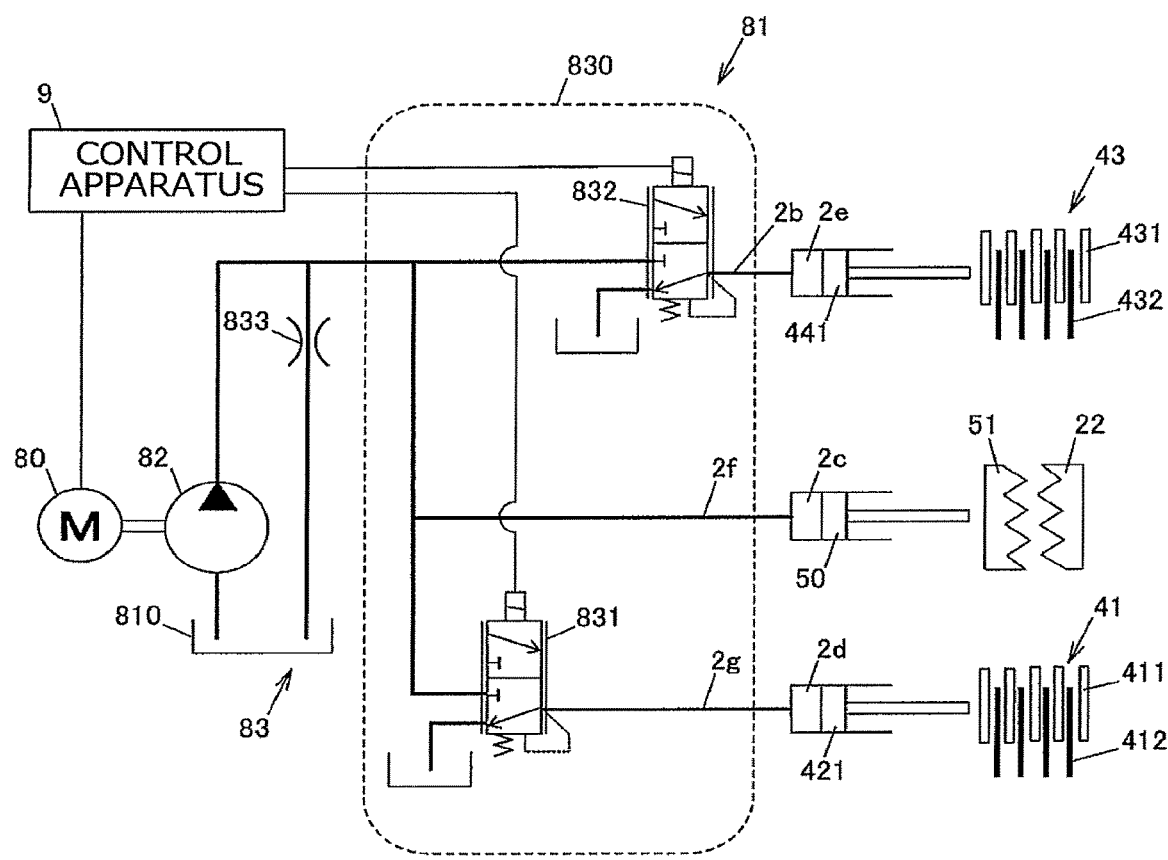
FIG. 8 is a hydraulic circuit diagram illustrating another example 2 of the structure of the hydraulic unit.

FIG. 8 is a hydraulic circuit diagram illustrating another example of the structure of the hydraulic unit 81. Similarly to the above, the hydraulic unit 81 according to the other example includes the single hydraulic pump 82 and the hydraulic circuit 83. The hydraulic circuit 83 distributes the pressure of the hydraulic oil, which is discharged from the hydraulic pump 82, to the first to third cylinder chambers 2c to 2e. The pressure regulating unit 830 of the hydraulic circuit 83 includes the first and second solenoid valves 831 and 832, but the discharge pressure of the hydraulic pump 82 is directly supplied to the first cylinder chamber 2c. Thus, the driving force connecting/disconnecting mechanism 5 is operated by the discharge pressure of the hydraulic pump 82 that is not reduced by the pressure regulating unit 830. The casing 2 has an oil path 2f and an oil path 2g that are formed separately. The oil path 2f guides the hydraulic oil, which is discharged from the hydraulic pump 82, directly to the first cylinder chamber 2c. The oil path 2g guides the hydraulic oil, which is output from the first solenoid valve 831, to the second cylinder chamber 2d.

Figure 9A:
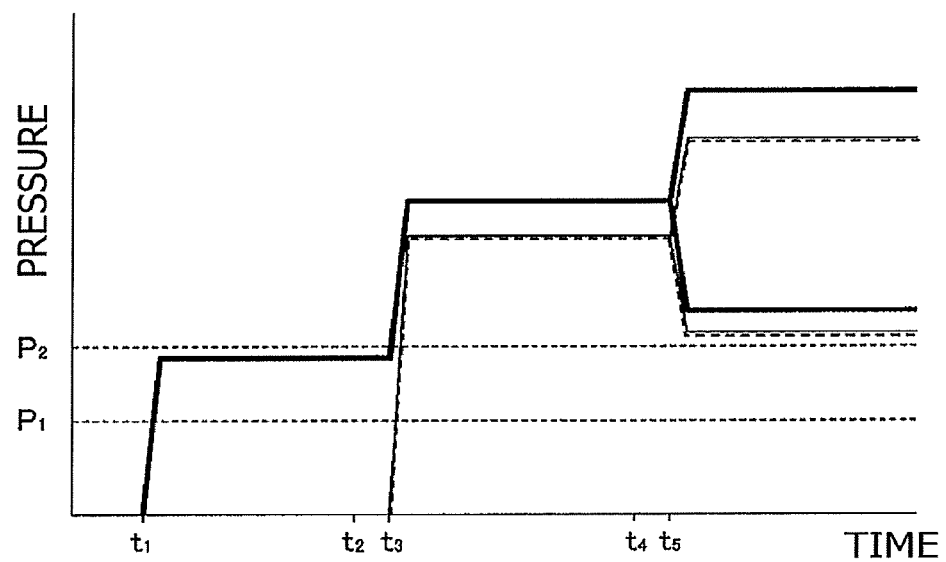
FIG. 9A is a graph illustrating the other example 2 of the changes in the discharge pressure of the hydraulic pump and the output hydraulic pressures of the first and second solenoid valves when the two-wheel drive mode is switched to the four-wheel drive mode.
Figure 9B:
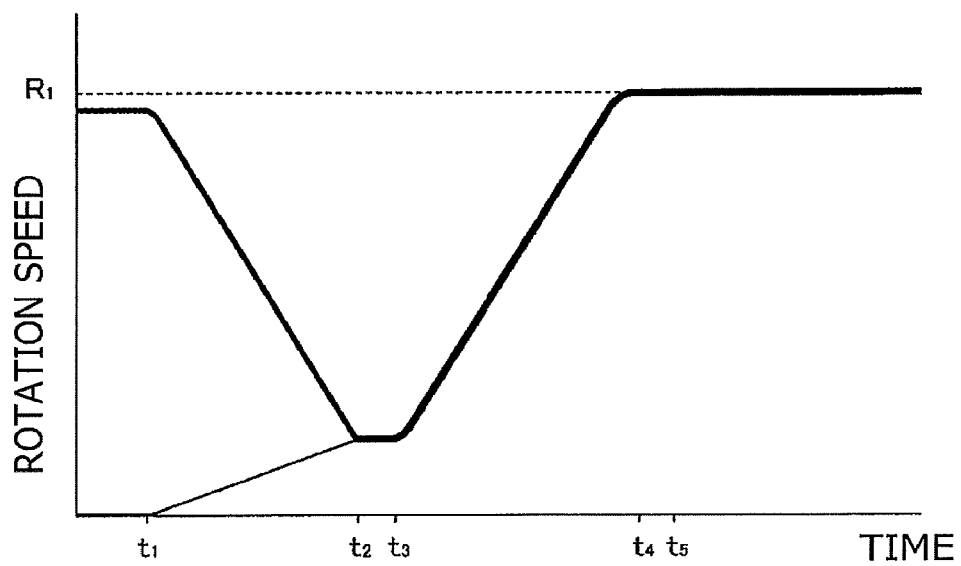
FIG. 9B is a graph illustrating the other example 2 of the changes in the rotation speeds of the intermediate rotational member and the ring gear member.

FIG. 9A is a graph illustrating an example of changes in the discharge pressure of the hydraulic pump 82 and the output hydraulic pressures of the first and second solenoid valves 831 and 832 when the four-wheel drive vehicle 100 is switched from the two-wheel drive mode to the four-wheel drive mode in the case of using the hydraulic unit 81 according to the other example. In FIG. 9B, the rotation speeds of the intermediate rotational member 3 and the ring gear member 22 when the hydraulic pressures of the respective portions change as illustrated in FIG. 9A are respectively indicated by a wide line and a narrow line.

In the control method of the control apparatus 9 for the driving force distribution apparatus 1 in this case, there is no need to output the hydraulic oil from the first and second solenoid valves 831 and 832 in the stage before the time $t_3$. FIG. 9A illustrates a case where the hydraulic oil is not output from the first and second solenoid valves 831 and 832 in the stage before the time $t_3$. Alternatively, the hydraulic oil may be output from the first and second solenoid valves 831 and 832 to the second and third cylinder chambers 2d and 2e before the time $t_3$.

According to the hydraulic unit 81 configured as described above and the control method for the hydraulic unit 81, the hydraulic oil discharged from the hydraulic pump 82 is directly supplied to the first cylinder chamber 2c. Thus, it is possible to further increase the frictional force of the friction member 52 for achieving the rotational synchronization between the ring gear member 22 and the intermediate rotational member 3.

According to the first embodiment described above, the hydraulic unit 81 distributes the hydraulic oil, which is discharged from the single hydraulic pump 82, to the first to third cylinder chambers 2c to 2e, thereby operating the driving force connecting/disconnecting mechanism 5 and the first and second driving force adjustment mechanisms 4R and 4L. Therefore, the number of components can be reduced as compared to a case where the respective mechanisms are operated by electromagnetic components including, for example, electromagnetic coils, whereby the size of the driving force distribution apparatus 1 and the assembling man-hours can be reduced.

The hydraulic circuit 83 includes the pressure regulating unit 830 configured to regulate the pressure of the hydraulic oil, which is discharged from the hydraulic pump 82, by reducing the pressure. The pressure regulating unit 830 includes the first solenoid valve 831 and the second solenoid valve 832. The first solenoid valve 831 is configured to regulate the pressure of the hydraulic oil for operating the second driving force adjustment mechanism 4L. The second solenoid valve 832 is configured to regulate the pressure of the hydraulic oil for operating the first driving force adjustment mechanism 4R. Thus, the torques to be transmitted by the first driving force adjustment mechanism 4R and the second driving force adjustment mechanism 4L can be adjusted accurately.

When the driving force connecting/disconnecting mechanism 5 is operated by the hydraulic oil whose pressure is regulated by the first solenoid valve 831, the number of components can further be reduced as compared to a case of using a dedicated solenoid valve for regulating the hydraulic pressure to be applied to the piston 50 of the driving force connecting/disconnecting mechanism 5. Further, the driving force connecting/disconnecting mechanism 5 is operated by the pressure of the hydraulic oil that is lower than that for the second driving force adjustment mechanism 4L. Thus, the driving force connecting/disconnecting mechanism 5 and the second driving force adjustment mechanism 4L can be operated independently through the control of the first solenoid valve 831.

When the driving force connecting/disconnecting mechanism 5 is operated by the discharge pressure of the hydraulic pump 82 that is not reduced by the pressure regulating unit 830, the driving force connecting/disconnecting mechanism 5 and the first and second driving force adjustment mechanisms 4R and 4L can be operated independently without increasing the number of solenoid valves. It is also possible to increase the frictional force of the friction member 52 for achieving the rotational synchronization between the ring gear member 22 and the intermediate rotational member 3.

When the rotational force is transmitted from the first driving force adjustment mechanism 4R and/or the second driving force adjustment mechanism 4L to the intermediate rotational member 3 while the friction member 52 generates the frictional force between the friction member 52 and the ring gear member 22, the speed of the propeller shaft 108 can be increased more quickly.

The structure of the main body 10 of the driving force distribution apparatus 1 is not limited to the structure described with reference to FIG. 2 to FIG. 4, and may be modified as appropriate. Driving force distribution apparatuses 1A and 1B each having a modified structure of the main body 10 are described below as second and third embodiments.

Next, a driving force distribution apparatus 1A according to a second embodiment of the present invention is described with reference to FIG. 5 to FIG. 7C. Similarly to the driving force distribution apparatus 1 according to the first embodiment, the driving force distribution apparatus 1A is used for distributing the driving force to the pair of right and left auxiliary driving wheels of the four-wheel drive vehicle.

Figure 10:
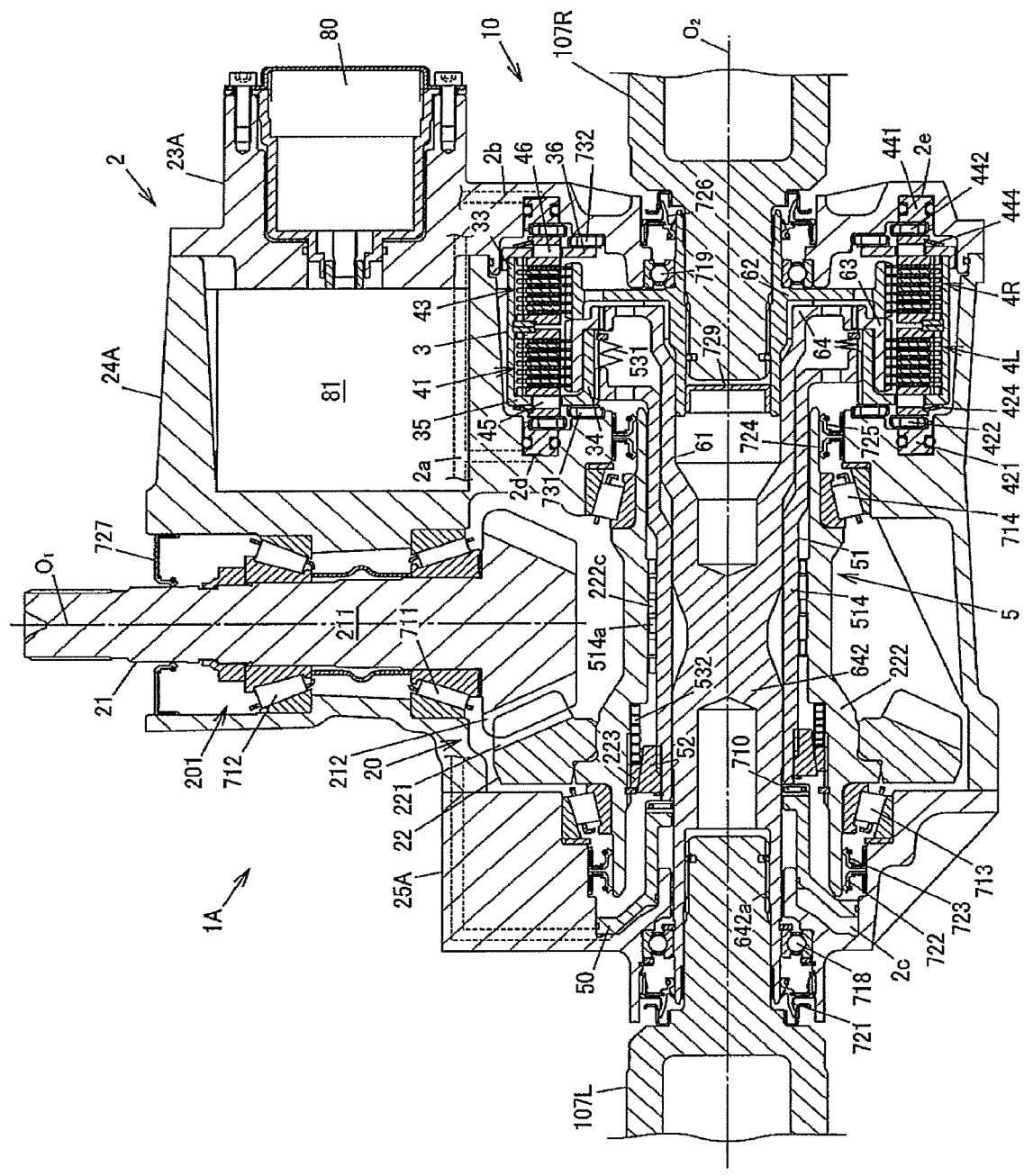
FIG. 10 is an overall sectional view illustrating an example of the structure of a driving force distribution apparatus according to a second embodiment of the present invention.
Figure 11:
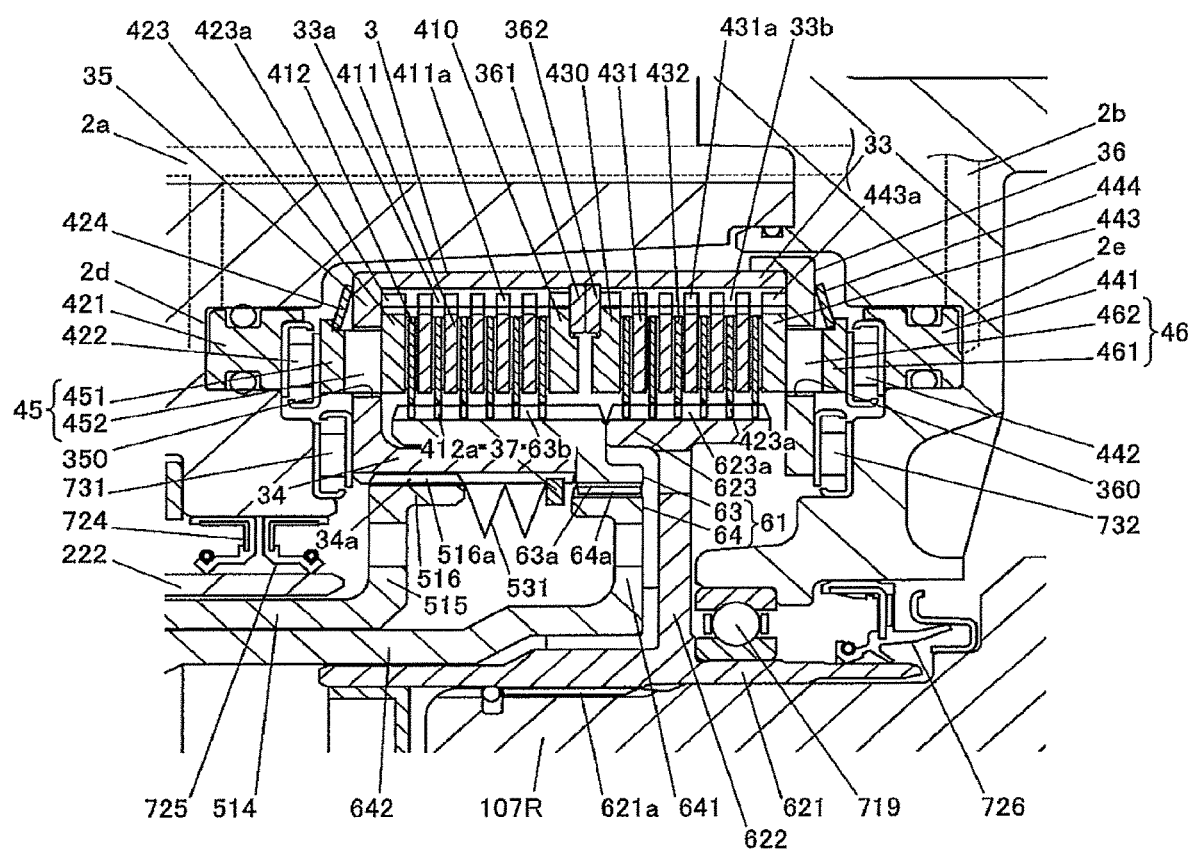
FIG. 11 is an enlarged view illustrating first and second driving force adjustment mechanisms of FIG. 10 and their periphery in an enlarged manner.
Figure 12A:
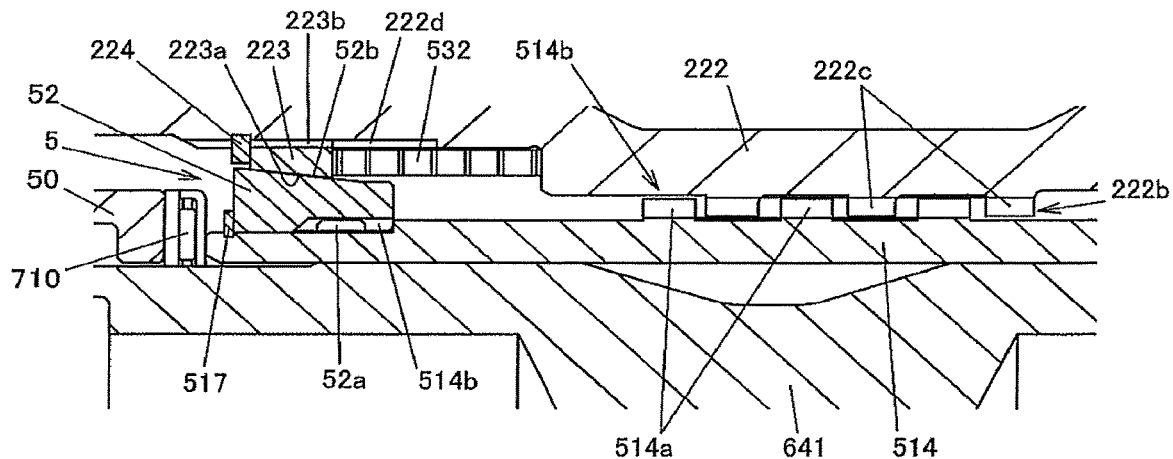
FIG. 12A is an enlarged view illustrating a meshing portion between a ring gear member and a clutch member of FIG. 10 and its periphery in an enlarged manner.
Figure 12B:
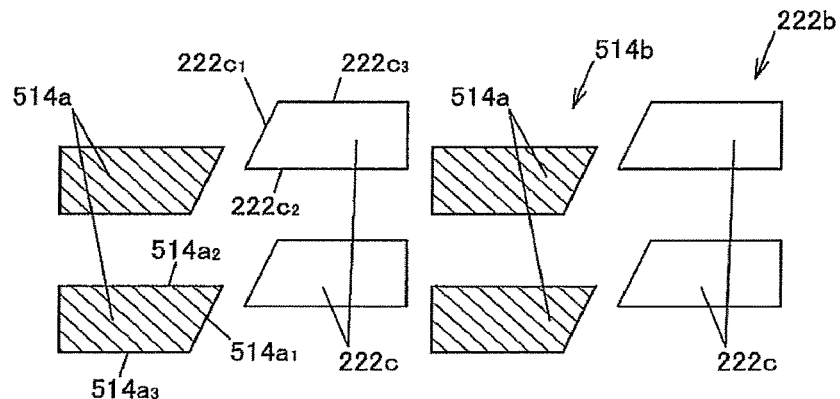
FIG. 12B is an explanatory view schematically illustrating the meshing portion between the ring gear member and the clutch member.
Figure 12C:
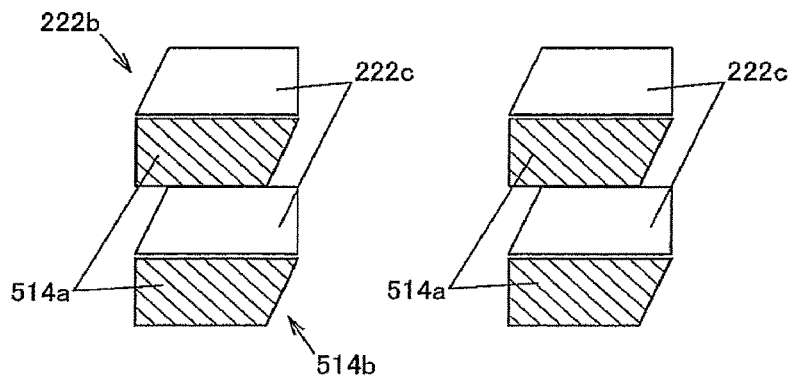
FIG. 12C is an explanatory view schematically illustrating the meshing portion between the ring gear member and the clutch member.

FIG. 10 is an overall sectional view illustrating an example of the structure of the driving force distribution apparatus 1A. FIG. 11 is an enlarged view illustrating the first and second driving force adjustment mechanisms 4R and 4L of FIG. 10 and their periphery in an enlarged manner. FIG. 12A is an enlarged view illustrating a meshing portion between the ring gear member 22 and the clutch member 51 of FIG. 10 and its periphery in an enlarged manner. FIG. 12B and FIG. 12C are explanatory views schematically illustrating the meshing portion between the ring gear member 22 and the clutch member 51.

In FIG. 10 to FIG. 12C, members or the like having functions similar to those described in the first embodiment are represented by the same reference symbols as those assigned in FIG. 2 to FIG. 4 to omit or simplify the description. Differences between the driving force distribution apparatus 1A according to the second embodiment and the driving force distribution apparatus 1 according to the first embodiment are mainly described below.

The casing 2 of the driving force distribution apparatus 1A is constituted by first to third case members 23A, 24A, and 25A. The first case member 23A houses the electric motor 80. The second case member 24A houses the hydraulic unit 81, the orthogonal gear pair 20, and the first and second driving force adjustment mechanisms 4R and 4L. The first cylinder chamber 2c for supplying the hydraulic pressure to the piston 50 is formed in the third case member 25A.

In this embodiment, both of the first and second driving force adjustment mechanisms 4R and 4L are arranged on one side of the ring gear member 22 in the direction of the rotation axis $O_2$. More specifically, the first and second driving force adjustment mechanisms 4R and 4L are arranged at positions located farther away from the ring gear portion 221 in the direction of the rotation axis $O_2$ than the bearing 714 located away from the ring gear portion 221 out of the pair of bearings 713 and 714 that support the ring gear member 22.

In the first embodiment, description is given of the case where the intermediate rotational member 3 is constituted by two members that are the first intermediate shaft member 31 and the second intermediate shaft member 32. In this embodiment, the intermediate rotational member 3 is a single member. Therefore, in the coupled state in which the intermediate rotational member 3 rotates together with the ring gear member 22, the first and second driving force adjustment mechanisms 4R and 4L adjust the driving force to be transmitted from the single intermediate rotational member 3 to the first and second output rotational members 61 and 62.

In this embodiment, as illustrated in FIG. 11, the clutch member 51 integrally has a hollow shaft portion 514, an annular plate portion 515, and a cylindrical portion 516. The shaft portion 514 is inserted into the tubular portion 222 of the ring gear member 22. The annular plate portion 515 projects radially outward from the outer peripheral surface at one end of the shaft portion 514 that protrudes from the tubular portion 222 of the ring gear member 22. The cylindrical portion 516 extends from the radially outer edge of the annular plate portion 515 in the axial direction parallel to the rotation axis $O_2$. The outer peripheral surface of the shaft portion 514 of the clutch member 51 that is located inside the tubular portion 222 of the ring gear member 22 is provided with a meshing portion 514b formed of a plurality of land-shaped (insular) protrusions 514a. The outer peripheral surface of the cylindrical portion 516 of the clutch member 51 is provided with a meshing portion 516a formed of a plurality of spline projections extending in the axial direction.

The inner peripheral surface of the tubular portion 222 of the ring gear member 22 is provided with a meshing portion 222b that meshes with the meshing portion 514b of the shaft portion 514 of the clutch member 51. In this embodiment, the meshing portion 222b is formed of a plurality of land-shaped protrusions $222c_1$.

Similarly to the first embodiment, the first driving force adjustment mechanism 4R includes the multi-disc clutch 43, the piston 441, the thrust roller bearing 442, the pressing plate 443, and the spring member 444. The multi-disc clutch 43 is constituted by the plurality of outer clutch plates 431 configured to rotate together with the intermediate rotational member 3, and the plurality of inner clutch plates 432 configured to rotate together with the second output rotational member 62. The thrust roller bearing 442 and the pressing plate 443 are arranged between the piston 441 and the multi-disc clutch 43. The spring member 444 urges the piston 441 away from the multi-disc clutch 43.

In this embodiment, the first driving force adjustment mechanism 4R includes a pressing force transmission member 46 configured to transmit the pressing force of the piston 441 from the thrust roller bearing 442 to the pressing plate 443. The pressing force transmission member 46 integrally has an annular portion 461 and a plurality of protruding portions 462. The protruding portions 462 protrude in the axial direction from a plurality of locations on the annular portion 461 in its circumferential direction.

Similarly to the first embodiment, the second driving force adjustment mechanism 4L includes the multi-disc clutch 41, the piston 421, the thrust roller bearing 422, the pressing plate 423, and the spring member 424. The multi-disc clutch 41 is constituted by the plurality of outer clutch plates 411 configured to rotate together with the intermediate rotational member 3, and the plurality of inner clutch plates 412 configured to rotate together with the first output rotational member 61. The thrust roller bearing 422 and the pressing plate 423 are arranged between the piston 421 and the multi-disc clutch 41. The spring member 424 urges the piston 421 away from the multi-disc clutch 41.

In this embodiment, the second driving force adjustment mechanism 4L includes a pressing force transmission member 45 configured to transmit the pressing force of the piston 421 from the thrust roller bearing 422 to the pressing plate 423. The pressing force transmission member 45 integrally has an annular portion 451 and a plurality of protruding portions 452. The protruding portions 452 protrude in the axial direction from a plurality of locations on the annular portion 451 in its circumferential direction.

The intermediate rotational member 3 integrally has an outer cylindrical portion 33, an inner cylindrical portion 34, and a wall portion 35. A meshing portion 33a and a meshing portion 33b are formed on the inner peripheral surface of the outer cylindrical portion 33. The meshing portion 33a is formed of a plurality of spline projections, and the outer clutch plates 411 of the second driving force adjustment mechanism 4L engage with the meshing portion 33a. The meshing portion 33b is formed of a plurality of spline projections, and the outer clutch plates 431 of the first driving force adjustment mechanism 4R engage with the meshing portion 33b. A meshing portion 34a is formed on the inner peripheral surface of the inner cylindrical portion 34. The meshing portion 34a is formed of a plurality of spline projections, and meshes with the meshing portion 516a of the clutch member 51. The wall portion 35 is provided between one axial end of the outer cylindrical portion 33 and one axial end of the inner cylindrical portion 34.

Snap rings 361 and 362 are fitted to the outer cylindrical portion 33. The snap rings 361 and 362 restrict axial movement of the receiving plate 410 on the second driving force adjustment mechanism 4L side and the receiving plate 430 on the first driving force adjustment mechanism 4R side. A cover plate 36 having a shape of a circular ring plate is fixed to the end of the outer cylindrical portion 33 that is opposite to the wall portion 35 by, for example, welding. The cover plate 36 and the wall portion 35 sandwich the multi-disc clutches 41 and 43.

The wall portion 35 of the intermediate rotational member 3 has axial through holes 350 through which the protruding portions 452 of the pressing force transmission member 45 are respectively inserted. The spring member 424 is a coned disc spring. One axial end of the spring member 424 abuts against the wall portion 35, and the other axial end of the spring member 424 abuts against the annular portion 451 of the pressing force transmission member 45. The spring member 424 urges the piston 421 away from the multi-disc clutch 41 via the pressing force transmission member 45. The cover plate 36 has axial through holes 360 through which the protruding portions 462 of the pressing force transmission member 46 are respectively inserted. The spring member 444 is a coned disc spring. One axial end of the spring member 444 abuts against the cover plate 36, and the other axial end of the spring member 444 abuts against the annular portion 461 of the pressing force transmission member 46. The spring member 444 urges the piston 441 away from the multi-disc clutch 43 via the pressing force transmission member 46.

A thrust roller bearing 731 is arranged between the wall portion 35 of the intermediate rotational member 3 and the second case member 24A. A thrust roller bearing 732 is arranged between the cover plate 36 and the first case member 23A. Axial movement of the intermediate rotational member 3 and the cover plate 36 is restricted by the thrust roller bearings 731 and 732.

In this embodiment, the first output rotational member 61 is constituted by a tubular member 63 and a shaft-shaped member 64 that are coupled by a coupling portion 61a so as not to be rotatable relative to each other. A spline fitting portion 63a is formed on the inner peripheral surface of the tubular member 63 so as to couple the tubular member 63 to the shaft-shaped member 64. A meshing portion 63b is formed on the outer peripheral surface of the tubular member 63. The meshing portion 63b is formed of a plurality of spline projections, and meshes with the plurality of protrusions 412a of the inner clutch plates 412. The shaft-shaped member 64 integrally has a flange portion 641 and a columnar shaft portion 642. A spline fitting portion 64a is formed on the outer peripheral surface of the flange portion 641. The shaft portion 642 is inserted into the shaft portion 514 of the clutch member 51. A spline fitting portion 642a is formed at the end of the shaft portion 642 that is opposite to the flange portion 641. The drive shaft 107L is coupled to the spline fitting portion 642a so as not to be rotatable relative to the spline fitting portion 642a. The tubular member 63 and the shaft-shaped member 64 are coupled to each other at the spline fitting portions 63a and $64a_1$.

When the hydraulic oil is supplied to the cylinder chamber 2c, the clutch member 51 is pressed by the piston 50 to move in the axial direction. The piston 50 presses the end of the shaft portion 514 of the clutch member 51 that is opposite to the annular plate portion 515 via the thrust roller bearing 710 arranged inside the tubular portion 222 of the ring gear member 22. The first spring member 531 is arranged between the distal end of the cylindrical portion 516 of the clutch member 51 and a snap ring 37 fitted to the inner cylindrical portion 34 of the intermediate rotational member 3. The first spring member 531 is compressed in the axial direction. In this embodiment, the first spring member 531 is formed of a plurality of coned disc springs arranged side by side in the axial direction.

As illustrated in FIG. 12A, the cylindrical friction member 52 is externally fitted to the shaft portion 514 of the clutch member 51. A meshing portion 52a formed on the inner peripheral surface of the friction member 52 meshes with the meshing portion 514b formed on the outer peripheral surface of the shaft portion 514 of the clutch member 51. Therefore, the friction member 52 is not rotatable relative to the clutch member 51. Axial movement of the friction member 52 relative to the clutch member 51 is restricted by a snap ring 517 fitted to the shaft portion 514 of the clutch member 51. Thus, in this embodiment, the friction member 52 is fixed to the clutch member 51.

The outer peripheral surface of the friction member 52 is formed as a tapered friction surface 52b. The friction surface 52b is brought into frictional contact with a target frictional slide surface 223a of a target friction member 223 that is coupled to the tubular portion 222 of the ring gear member 22 so as not to be rotatable but axially movable relative to the tubular portion 222. The outer peripheral surface of the target friction member 223 is provided with a meshing portion 223b formed of a plurality of spline projections extending in the axial direction. The inner peripheral surface of the tubular portion 222 of the ring gear member 22 is provided with a meshing portion 222d that is formed of a plurality of spline projections and meshes with the meshing portion 223b of the target friction member 223. The target frictional slide surface 223a of the target friction member 223 is tapered so as to be brought into surface contact with the friction surface 52b of the friction member 52.

The target friction member 223 is urged toward the piston 50 along the axial direction by the second spring member 532 arranged between one axial end face of the target friction member 223 and a stepped surface formed on the tubular portion 222 of the ring gear member 22. Axial movement of the target friction member 223 in the urging direction is restricted by a snap ring 224 fitted to the tubular portion 222 of the ring gear member 22.

In FIG. 10, a part above the rotation axis $O_2$ indicates a state in which the hydraulic pressure in the cylinder chamber 2c is low, and a part below the rotation axis $O_2$ indicates a state in which the hydraulic pressure is supplied to the cylinder chamber 2c to move the piston 50. When the hydraulic pressure in the cylinder chamber 2c is low, the piston 50 is located at its initial position where the piston 50 is pressed away from the first and second driving force adjustment mechanisms 4R and 4L by the first spring member 531. When the hydraulic oil is supplied from the hydraulic unit 81 to the cylinder chamber 2c, the piston 50 moves the clutch member 51 toward the first and second driving force adjustment mechanisms 4R and 4L against the urging force of the first spring member 531.

When the clutch member 51 moves toward the first and second driving force adjustment mechanisms 4R and 4L, the friction surface 52b of the friction member 52 is first brought into contact with the target frictional slide surface 223a of the target friction member 223. At this time, the second spring member 532 brings the friction surface 52b of the friction member 52 into elastic contact with the target frictional slide surface 223a of the target friction member 223. When the clutch member 51 further moves toward the first and second driving force adjustment mechanisms 4R and 4L, the meshing portion 514b of the clutch member 51 that is formed of the land-shaped protrusions 514a meshes with the meshing portion 222b of the ring gear member 22 that is formed of the land-shaped protrusions $222c_1$.

As illustrated in FIG. 12B and FIG. 12C, the meshing portion 514b of the clutch member 51 is formed such that multiple rows of the land-shaped protrusions 514a arranged along the circumferential direction are spaced away from each other in the axial direction. Similarly, the meshing portion 222b of the ring gear member 22 is formed such that multiple rows of the land-shaped protrusions 222c are spaced away from each other in the axial direction. When the piston 50 is located at its initial position, as illustrated in FIG. 12B, the land-shaped protrusions 514a of the clutch member 51 and the land-shaped protrusions 222c of the ring gear member 22 do not mesh with each other. Therefore, the clutch member 51 is rotatable relative to the ring gear member 22. When the clutch member 51 is moved by receiving the pressing force of the piston 50, as illustrated in FIG. 12C, the land-shaped protrusions 514a of the clutch member 51 and the land-shaped protrusions 222c of the ring gear member 22 mesh with each other. Therefore, the clutch member 51 and the intermediate rotational member 3 are brought into the coupled state in which the clutch member 51 and the intermediate rotational member 3 rotate together with the ring gear member 22.

In each of the land-shaped protrusions 514a of the clutch member 51, a facing surface $514a_1$ that faces the land-shaped protrusion 222c of the ring gear member 22 in the axial direction (lateral direction in FIG. 12A) is a surface inclined with respect to the circumferential direction. Similarly, in each of the land-shaped protrusions 222c of the ring gear member 22, a facing surface $222c_1$ that faces the land-shaped protrusion 514a of the clutch member 51 in the axial direction is a surface inclined with respect to the circumferential direction. Each of the land-shaped protrusions 514a of the clutch member 51 and the land-shaped protrusions 222c of the ring gear member 22 has a trapezoidal shape in which the facing surfaces $514a_1$ and $222c_1$ face each other in parallel. Long side and short side faces $514a_2$ and $514a_3$ of each of the land-shaped protrusions 514a of the clutch member 51 and long side and short side faces $222c_2$ and $222c_3$ of each of the land-shaped protrusions 222c of the ring gear member 22 are parallel to each other in the axial direction.

When the clutch member 51 is moved in the axial direction by receiving the pressing force of the piston 50, the facing surface $514a_1$ of each of the land-shaped protrusions 514a of the clutch member 51 abuts against the facing surface $222c_1$ of each of the land-shaped protrusions 222c of the ring gear member 22. Through the slide of the facing surfaces $514a_1$ and $222c_1$, the land-shaped protrusion 514a of the clutch member 51 enters a space between two land-shaped protrusions 222c of the ring gear member 22 that are adjacent to each other in the circumferential direction. Thus, the meshing portion 514b of the clutch member 51 and the meshing portion 222b of the ring gear member 22 mesh with each other.

When the clutch member 51 is located at the decoupled position as indicated by the part above the rotation axis $O_2$ in FIG. 10, the meshing portion 514b of the clutch member 51 does not mesh with the meshing portion 222b of the ring gear member 22. When the clutch member 51 is located at the coupled position as indicated by the part below the rotation axis $O_2$, the meshing portion 514b of the clutch member 51 meshes with the meshing portion 222b of the ring gear member 22. The meshing portion 516a of the clutch member 51 constantly meshes with the meshing portion 34a of the inner cylindrical portion 34 of the intermediate rotational member 3.

The driving force distribution apparatus 1A according to this embodiment operates similarly to the driving force distribution apparatus 1 according to the first embodiment. That is, when the decoupled state in which the intermediate rotational member 3 is rotatable relative to the ring gear member 22 is switched to the coupled state in which the clutch member 51 and the intermediate rotational member 3 rotate together with the ring gear member 22, the control apparatus 9 controls the electric motor 80 and the hydraulic unit 81 to supply the hydraulic oil to the first oil path 2a, thereby moving the clutch member 51 and the friction member 52 in the axial direction. When the rotation of the ring gear member 22 and the rotation of the intermediate rotational member 3 are synchronized by the frictional force between the friction surface 52b of the friction member 52 and the target frictional slide surface 223a of the target friction member 223, the meshing portion 514b of the clutch member 51 meshes with the meshing portion 222b of the ring gear member 22. Therefore, the ring gear member 22 and the intermediate rotational member 3 are coupled by the clutch member 51 so as not to be rotatable relative to each other.

Then, the control apparatus 9 controls the electric motor 80 and the hydraulic unit 81 to increase the hydraulic pressure of the hydraulic oil supplied to the cylinder chambers 2d and 2e, thereby transmitting the rotational forces of the drive shafts 107R and 107L to the propeller shaft 108 via the first and second driving force adjustment mechanisms 4R and 4L, the intermediate rotational member 3, the clutch member 51, and the orthogonal gear pair 20. Thus, the propeller shaft 108 is rotated. When the rotation of the first rotational member 121 and the rotation of the second rotational member 122 are synchronized in the dog clutch 12, the control apparatus 9 controls the actuator 120. The actuator 120 causes the sleeve 123 to couple the first rotational member 121 and the second rotational member 122 so that the first rotational member 121 and the second rotational member 122 are not rotatable relative to each other.

The driving force distribution apparatus 1A includes the hydraulic unit 81 configured similarly to the hydraulic unit 81 described in the first embodiment, and is controlled by the control apparatus 9 by the control method similar to that of the first embodiment. The driving force distribution apparatus 1A according to the second embodiment can attain actions and effects similar to those of the first embodiment.

The first and second driving force adjustment mechanisms 4R and 4L adjust the driving force to be transmitted from the single intermediate rotational member 3 to the first and second output rotational members 61 and 62 in the coupled state in which the ring gear member 22 and the intermediate rotational member 3 are coupled by the clutch member 51 so as to rotate together. Thus, the number of components can be reduced.

The first and second driving force adjustment mechanisms 4R and 4L are arranged at the positions located farther away from the ring gear portion 221 in the direction of the rotation axis $O_2$ than the bearing 714 located away from the ring gear portion 221 out of the pair of bearings 713 and 714 that support the ring gear member 22. Thus, the apparatus can be downsized particularly in the radial direction orthogonal to the rotation axis $O_2$.

Next, a third embodiment of the present invention is described with reference to FIG. 13 and FIG. 14. A driving force distribution apparatus 1B according to the third embodiment is different from the driving force distribution apparatus 1A according to the second embodiment in terms of the structure in which the ring gear member 22 and the intermediate rotational member 3 are coupled by the clutch member 51. The other structures are in common with those of the driving force distribution apparatus 1A.

Figure 13:
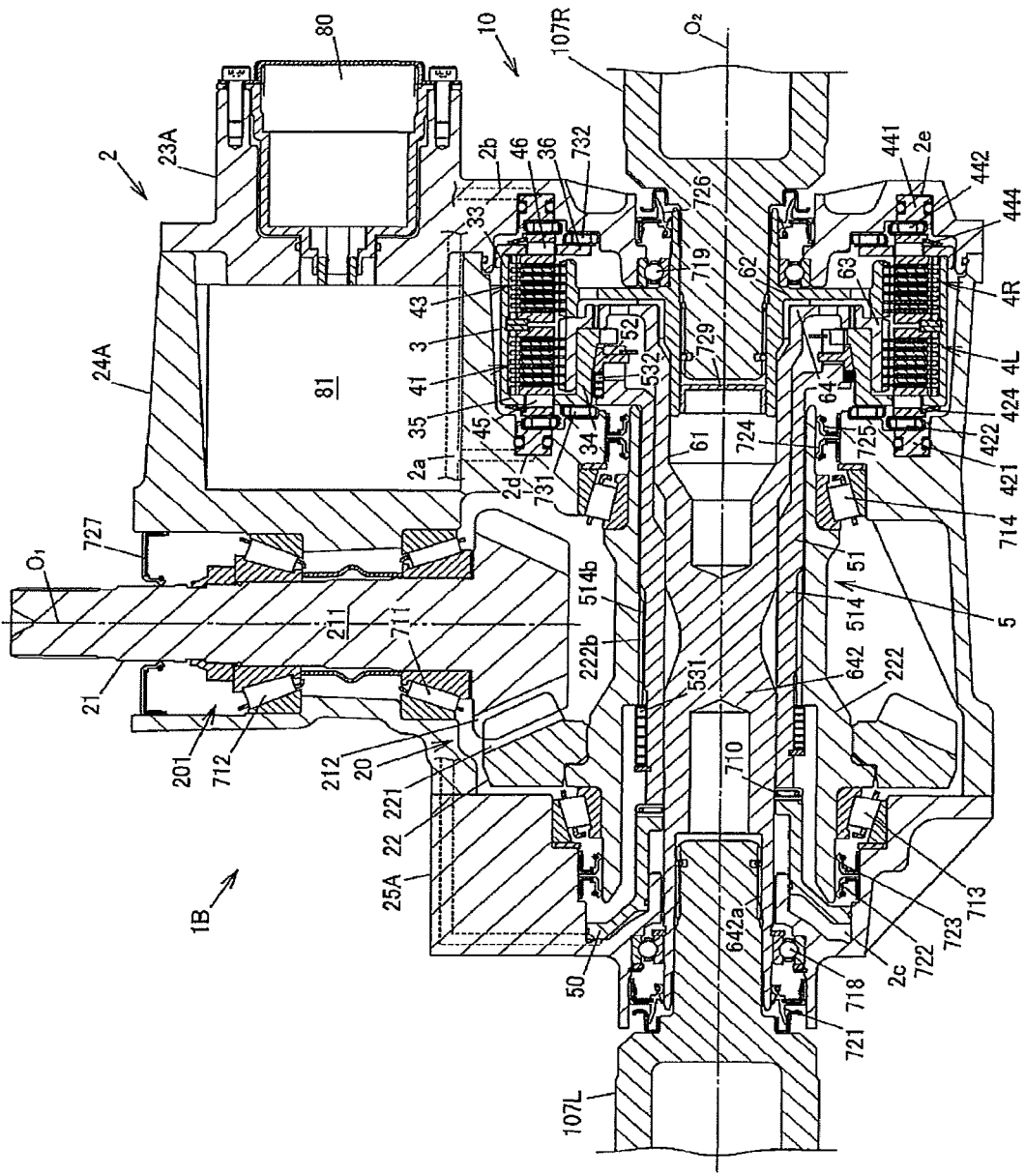
FIG. 13 is an overall sectional view illustrating an example of the structure of a driving force distribution apparatus according to a third embodiment of the present invention.
Figure 14:
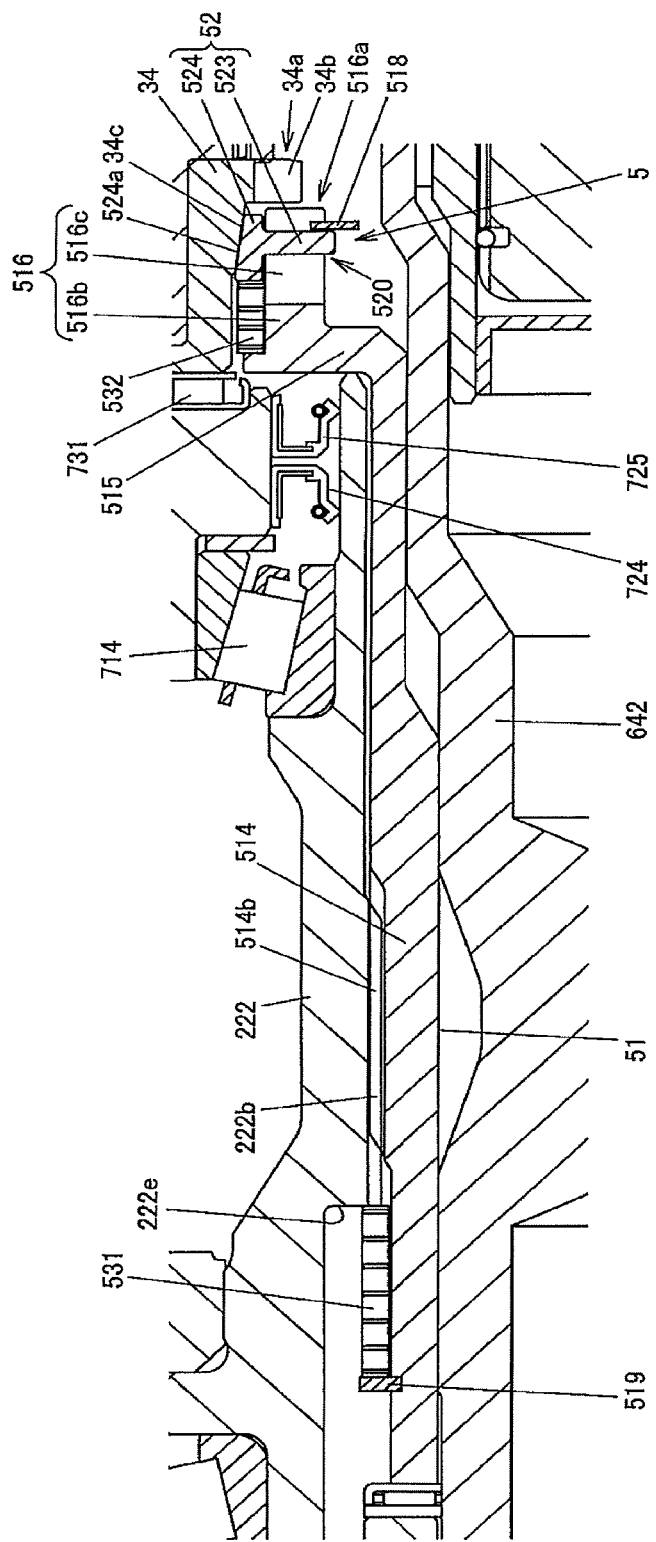
FIG. 14 is an enlarged view illustrating a clutch member of FIG. 13 and its periphery in an enlarged manner.

FIG. 13 is an overall sectional view illustrating an example of the structure of the driving force distribution apparatus 1B. FIG. 14 is an enlarged view illustrating the clutch member 51 of FIG. 13 and its periphery in an enlarged manner. In FIG. 13 and FIG. 14, members or the like having functions similar to those described in the second embodiment are represented by the same reference symbols as those assigned in FIG. 10 to FIG. 12C to omit or simplify the description.

In the second embodiment, description is given of the case where the meshing portion 516a of the clutch member 51 constantly meshes with the meshing portion 34a of the inner cylindrical portion 34 of the intermediate rotational member 3 and the meshing portion 514b of the clutch member 51 and the meshing portion 222b of the ring gear member 22 mesh with each other when the clutch member 51 is located at the coupled position. In the third embodiment, conversely, the meshing portion 514b of the clutch member 51 and the meshing portion 222b of the ring gear member 22 constantly mesh with each other. The meshing portion 516a of the clutch member 51 and the meshing portion 34a of the inner cylindrical portion 34 of the intermediate rotational member 3 mesh with each other when the clutch member 51 is located at the coupled position, and do not mesh with each other when the clutch member 51 is located at the decoupled position.

In this embodiment, each of the meshing portion 514b of the clutch member 51 and the meshing portion 222b of the ring gear member 22 is formed of a plurality of spline projections extending in the axial direction. The clutch member 51 is movable in the axial direction relative to the ring gear member 22 while maintaining the state in which the meshing portion 514b meshes with the meshing portion 222b of the ring gear member 22. The clutch member 51 is not rotatable relative to the ring gear member 22 but rotates together with the ring gear member 22 through the mesh between the meshing portions 514b and 222b.

Similarly to the second embodiment, the clutch member 51 integrally has the hollow shaft portion 514, the annular plate portion 515, and the cylindrical portion 516.

The shaft portion 514 is inserted into the tubular portion 222 of the ring gear member 22. The annular plate portion 515 projects radially outward from the outer peripheral surface at one end of the shaft portion 514 that protrudes from the tubular portion 222 of the ring gear member 22. The cylindrical portion 516 extends from the radially outer edge of the annular plate portion 515 in the axial direction parallel to the rotation axis $O_2$. The cylindrical portion 516 is constituted by a circular ring portion 516b and a plurality of protruding portions 516c. The protruding portions 516c protrude in the axial direction from the circular ring portion 516b. The protruding portions 516c constitute the meshing portion 516a configured to mesh with the intermediate rotational member 3.

The meshing portion 34a is formed on the inner cylindrical portion 34 of the intermediate rotational member 3. The meshing portion 34a is formed of a plurality of protrusions 34b, and the meshing portion 516a of the cylindrical portion 516 of the clutch member 51 meshes with the meshing portion 34a. The protrusions 34b are formed so as to protrude radially inward from one axial end of the inner cylindrical portion 34. The meshing portion 516a of the clutch member 51 is provided at a part that protrudes in the direction of the rotation axis $O_2$ from the tubular portion 222 of the ring gear member 22.

In this embodiment, the annular friction member 52 is supported on the protruding portions 516c of the clutch member 51 so as to be movable in the axial direction. The friction member 52 integrally has an annular plate portion 523 and a cylindrical portion 524. The annular plate portion 523 has a plurality of through holes 520 through which the protruding portions 516c are inserted. The cylindrical portion 524 extends from the radially outer edge of the annular plate portion 523 in the axial direction. The friction member 52 is movable in the direction of the rotation axis $O_2$ relative to the ring gear member 22 and the intermediate rotational member 3. Axial movement of the friction member 52 away from the circular ring portion 516b of the cylindrical portion 516 of the clutch member 51 is restricted by a snap ring 518 fitted to the protruding portions $516c_1$.

The outer peripheral surface of the cylindrical portion 524 of the friction member 52 is formed as a tapered friction surface 524a to be brought into frictional contact with a target frictional slide surface 34c formed on the inner peripheral surface of the inner cylindrical portion 34 of the intermediate rotational member 3. The target frictional slide surface 34c of the intermediate rotational member 3 is tapered so as to be brought into surface contact with the friction surface 524a of the friction member 52.

The friction member 52 is urged away from the circular ring portion 516b of the cylindrical portion 516 of the clutch member 51 by the second spring member 532 arranged on the outer peripheral side of the cylindrical portion 516. For example, the second spring member 532 is a coiled wave spring, and is arranged between a stepped surface of the clutch member 51 and the axial end face of the cylindrical portion 524 of the friction member 52 while being compressed in the axial direction.

A snap ring 519 is fitted to the shaft portion 514 of the clutch member 51 on its outer peripheral surface that is closer to the piston 50 with respect to the meshing portion 514b. The first spring member 531 is arranged between the snap ring 519 and a stepped surface 222e formed on the inner periphery of the tubular portion 222 of the ring gear member 22. The first spring member 531 is compressed in the axial direction. For example, the first spring member 531 is a coiled wave spring, and urges the clutch member 51 and the friction member 52 in a direction opposite to the pressing direction of the piston 50.

The clutch member 51 moves in the axial direction between the coupled position where the meshing portion 514b meshes with the meshing portion 222b of the ring gear member 22 and the meshing portion 516a meshes with the meshing portion 34a of the intermediate rotational member 3 and the decoupled position where the meshing portion 514b meshes with the meshing portion 222b of the ring gear member 22 but the meshing portion 516a does not mesh with the meshing portion 34a of the intermediate rotational member 3.

The driving force distribution apparatus 1B according to this embodiment includes the hydraulic unit 81 configured similarly to the hydraulic unit 81 described in the first embodiment, and is controlled by the control apparatus 9 by the control method similar to that of the first embodiment. The driving force distribution apparatus 1B operates similarly to the driving force distribution apparatuses 1 and 1A according to the first and second embodiments. That is, when the decoupled state in which the intermediate rotational member 3 is rotatable relative to the ring gear member 22 is switched to the coupled state in which the clutch member 51 and the intermediate rotational member 3 rotate together with the ring gear member 22, the control apparatus 9 controls the electric motor 80 and the hydraulic unit 81 to supply the hydraulic oil to the first oil path 2a, thereby moving the clutch member 51 and the friction member 52 in the axial direction. When the rotation of the ring gear member 22 and the rotation of the intermediate rotational member 3 are synchronized by the frictional force between the friction surface 524a of the friction member 52 and the target frictional slide surface 34c of the intermediate rotational member 3, the meshing portion 516a of the clutch member 51 meshes with the meshing portion 34a of the intermediate rotational member 3. Therefore, the ring gear member 22 and the intermediate rotational member 3 are coupled by the clutch member 51 so as not to be rotatable relative to each other.

The driving force distribution apparatus 1B includes the hydraulic unit 81 configured similarly to the hydraulic unit 81 described in the first embodiment, and is controlled by the control apparatus 9 by the control method similar to that of the first embodiment. Thus, the driving force distribution apparatus 1B according to the third embodiment can attain actions and effects similar to those of the first embodiment.

What is claimed is:

1. A driving force distribution apparatus configured to output a driving force from a first output rotational member and a second output rotational member, the driving force input to the first output rotational member and the second output rotational member from an input rotational member via an intermediate rotational member, the driving force distribution apparatus comprising:
    a driving force connecting/disconnecting mechanism configured to connect or disconnect the driving force between the input rotational member and the intermediate rotational member;
    a first driving force adjustment mechanism configured to adjust the driving force to be transmitted between the intermediate rotational member and the first output rotational member;
    a second driving force adjustment mechanism configured to adjust the driving force to be transmitted between the intermediate rotational member and the second output rotational member;
    a hydraulic unit configured to generate pressures of hydraulic oil for operating the driving force connecting/disconnecting mechanism, the first driving force adjustment mechanism, and the second driving force adjustment mechanism; and
    a casing that houses the driving force connecting/disconnecting mechanism, the first driving force adjustment mechanism, and the second driving force adjustment mechanism, wherein
    the casing has a plurality of cylinder chambers in which hydraulic pressures of the hydraulic oil supplied from the hydraulic unit are applied to a piston of the driving force connecting/disconnecting mechanism, a piston of the first driving force adjustment mechanism, and a piston of the second driving force adjustment mechanism,
    the hydraulic unit includes:
        a single hydraulic pump; and
        a hydraulic circuit configured to distribute a pressure of the hydraulic oil, which is discharged from the hydraulic pump, to the plurality of cylinder chambers, and
    the pressure in the cylinder chamber when the piston of the driving force connecting/disconnecting mechanism starts to operate is lower than the pressures when the piston of the first driving force adjustment mechanism and the piston of the second driving force adjustment mechanism start to operate.

2. The driving force distribution apparatus according to claim 1, wherein
    the intermediate rotational member is coaxially rotatable relative to an orthogonal gear member that meshes with the input rotational member with their gear axes set orthogonal to each other, and
    the driving force connecting/disconnecting mechanism includes:
        a clutch member to be pressed by the piston to couple the orthogonal gear member and the intermediate rotational member so that the orthogonal gear member and the intermediate rotational member are not rotatable relative to each other;
        a friction member configured to generate a frictional force for achieving rotational synchronization between the orthogonal gear member and the intermediate rotational member;
        a first spring member configured to urge the clutch member and the friction member in a direction opposite to a pressing direction of the piston; and
        a second spring member configured to bring a friction surface of the friction member into elastic contact with a target frictional slide surface.

3. The driving force distribution apparatus according to claim 2, wherein, when the friction member generates the frictional force, a rotational force is transmitted to the intermediate rotational member via at least one of the first driving force adjustment mechanism and the second driving force adjustment mechanism.

* * * * *